United States Patent
Leeman-Munk et al.

(10) Patent No.: US 10,324,983 B2
(45) Date of Patent: Jun. 18, 2019

(54) INTERACTIVE VISUALIZATIONS FOR A RECURRENT NEURAL NETWORK

(71) Applicants: SAS Institute Inc., Cary, NC (US); North Carolina State University, Raleigh, NC (US)

(72) Inventors: Samuel Paul Leeman-Munk, Cary, NC (US); Saratendu Sethi, Raleigh, NC (US); Christopher Graham Healey, Cary, NC (US); Shaoliang Nie, Raleigh, NC (US); Kalpesh Padia, Raleigh, NC (US); Ravinder Devarajan, Cary, NC (US); David James Caira, Chapel Hill, NC (US); Jordan Riley Benson, Ellerbe, NC (US); James Allen Cox, Cary, NC (US); Lawrence E. Lewis, Raleigh, NC (US)

(73) Assignees: SAS INSTITUTE INC., Cary, NC (US); NORTH CAROLINA STATE UNIVERSITY, Raleigh, NC (US)

( * ) Notice: Subject to any disclaimer, the term of this patent is extended or adjusted under 35 U.S.C. 154(b) by 0 days.

(21) Appl. No.: 16/138,446

(22) Filed: Sep. 21, 2018

(65) Prior Publication Data
US 2019/0034558 A1    Jan. 31, 2019

Related U.S. Application Data

(63) Continuation-in-part of application No. 15/725,026, filed on Oct. 4, 2017, now Pat. No. 10,192,001, which
(Continued)

(51) Int. Cl.
*G06N 3/10* (2006.01)
*G06F 16/904* (2019.01)
(Continued)

(52) U.S. Cl.
CPC ........ *G06F 16/904* (2019.01); *G06F 3/04812* (2013.01); *G06F 3/04842* (2013.01);
(Continued)

(58) Field of Classification Search
CPC ..................................................... G06N 3/105
(Continued)

(56) References Cited

U.S. PATENT DOCUMENTS

2006/0070005 A1   3/2006  Gilbert et al.
2015/0346972 A1  12/2015  Boekling et al.
(Continued)

OTHER PUBLICATIONS

Krizhevsky et al., "ImageNet Classification with Deep Convolutional Neural Networks" NIPS Proceedings, (2012), 9 pages.
(Continued)

*Primary Examiner* — Lut Wong
(74) *Attorney, Agent, or Firm* — Kilpatrick Townsend & Stockton LLP

(57) ABSTRACT

Recurrent neural networks (RNNs) can be visualized. For example, a processor can receive vectors indicating values of nodes in a gate of a RNN. The values can result from processing data at the gate during a sequence of time steps. The processor can group the nodes into clusters by applying a clustering method to the values of the nodes. The processor can generate a first graphical element visually indicating how the respective values of the nodes in a cluster changed during the sequence of time steps. The processor can also determine a reference value based on multiple values for multiple nodes in the cluster, and generate a second graphical element visually representing how the respective values of the nodes in the cluster each relate to the reference value. The processor can cause a display to output a graphical user interface having the first graphical element and the second graphical element.

29 Claims, 16 Drawing Sheets

Related U.S. Application Data is a continuation-in-part of application No. 15/584,984, filed on May 2, 2017, now Pat. No. 9,934,462.

(60) Provisional application No. 62/679,932, filed on Jun. 3, 2018, provisional application No. 62/486,112, filed on Apr. 17, 2017, provisional application No. 62/439,968, filed on Dec. 29, 2016, provisional application No. 62/403,944, filed on Oct. 4, 2016.

(51) Int. Cl.
  G06F 3/0484 (2013.01)
  G06N 3/04 (2006.01)
  G06K 9/62 (2006.01)
  G06F 3/0481 (2013.01)

(52) U.S. Cl.
  CPC ............. G06K 9/6223 (2013.01); G06N 3/04 (2013.01); G06N 3/105 (2013.01)

(58) Field of Classification Search
  USPC .......................................................... 706/11
  See application file for complete search history.

(56) References Cited

U.S. PATENT DOCUMENTS

| | | |
|---|---|---|
| 2016/0350336 A1 | 12/2016 | Checka et al. |
| 2017/0364800 A1 | 12/2017 | Kiranyaz et al. |

OTHER PUBLICATIONS

Dos Santos et al., "Deep Convolutional Networks for Sentiment Analysis of Short Texts" Proceedings of COLING 2014, the 25th International Conference on Computational Linguistics: Technical Papers Dublin, Ireland, (Aug. 23-29, 2014) pp. 69-78.
Erhan et al., "Visualizing Higher-Layer Fatures of a Deep Network" University of Montreal, Technical Report 1341 (Jul. 9, 2009) 13 pages.
Hinton et al., "Deep Neural Networks for Acoustic Modeling in Speech Recognition" University of Toronto, (Apr. 27, 2012) 27 pages.
Lin et al., "Why does deep and cheap learning work so well?" Dept. of Physics, Harvard University and Dept. of Physics MIT Kavli Institute (Aug. 31, 2016) 14 pages.
Herman et al., "Graph Visualization and Navigation in Information Visualization" IEEE Transactions on Visualization and Computer Graphics, vol. 6 No. X (2000) 21 pages.
Leeman-Munk et al., "Deep Encoding and Reconstruction for Normalization of Noisy Text" Proceedings of the ACL 2015 Workshop on Noisy User-generated Text, Beijing, China (2015) pp. 154-161.
Ciresan et al., "Multi-column Deep Neural Networks for Image Classification" IDSIA USI-SUPSI, Lugano, Switzerland (2012) 8 pages.
Yosinski et al., "Understanding Neural Networks Through Deep Visualization" 31st International Conference on Machine Learning, Lille, France (2015), 12 pages.
Zeiler et al., "Visualizing and Understanding Convolutional Networks" Department of Computer Science, New York University (2014) 16 pages.
Ghoniem et al., "A comparison of the Readability of Graphs Using Node-Link and Matrix-Based Representations" IEEE Symposium on Information Visualization Oct. 10-12, 2004 Austin, TX (2004) 8 pages.
Ribeiro et al., "Why Should I Trust You?" Explaining the Predictions of Any Classifier, Computer Science & Engineering, University of Washington,(2017) 8 pages.
Henry et al., "Node Trix: A Hybrid Visualization of Social Networks" INRIA Futurs, France, (2007) 8 pages.
Kalchubrenner et al., "A Convolutional Neural Network for Modelling Sentences" Department of Computer Science, University of Oxford (2014) 11 pages.
Xu et al., "Interactive Visual Co-Cluster Analysis of Bipartite Graphs" IEEE VGTC sponsored conference proceedings (2016) 8 pages.
Kotsiantis, "Supervised Machine Learning: A Review of Classification Techniques" Department of Computer Science and Technology, University of Peloponnese, Greece (2007) 20 pages.
Russell et al., "Research Priorities for Robust and Beneficial Artificial Intelligence" Association for the Advancement of Artificial Intelligence, ISSN 0738-4602, (Winter 2015) 10 pages.
Playground Tensorflow, "A Neural Network Playground" retrieved from http://playground.tensorflow.org/ (2017) 3 pages.
Watson et al., "Visualizing very large layered graphs with quilts" retrieved from www.researchgate.net (2007), 9 pages.
Kim, "Convolutional Neural Networks for Sentence Classification" New York University, Proceedings of the 2014 Conference on Empirical Methods in Natural Language Proceedings (2014) pp. 1746-1751.
LeCun et al., "Deep learning" Macmillan Publishers Limited, 436 Nature vol. 521, (May 2015) 9 pages.
Zhang et al., "A Visual Analytics Approach to High-Dimensional Logistic Regression Modeling and its Application to an Environmental Health Study" IEEE Pacific Visualization Symposium (2016) 8 pages.
Non-Final Office Action dated Jul. 7, 2017 for U.S. Appl. No. 15/584,984, 12 pages.
Harley Adam W. "An Interactive Node-Link Visualization of Convolutional Neural Networks" Springer International Publishing Switzerland (2015) 11 pages.
Landesberger et al., "Visual Analysis of Large Graphs: State-of-the-Art and Future Research Challenges" Computer Graphics forum vol. 20 No. 6 (2011) 31 pages.
Rauber et al., "Visualizing the Hidden Activity of Artificial Neural Networks" IEEE Transactions on Visualization and Computer Graphics 23, 1, (2016) 10 pages.
Liu et al., "Towards Better Analysis of Deep Convolutional Neural Networks" IEEE Transactions on Visualization and Computer Graphics 23, 1, (2016) 10 pages.
Li Jiwei et al., "Visualizing and Understanding Neural Models in NLP" arXiv preprint arXiv:1506.01066, (2015) 10 pages.
Maaten et al., "Visualizing Data using t-SNE" Journal of Machine Learning Research 9, (2008) 27 pages.
Final Office Action dated Nov. 2, 2017 for U.S. Appl. No. 15/584,984, 15 pages.
Notice of Allowance dated Jan. 17, 2018 for U.S. Appl. No. 15/584,984, 8 pages.
Non-Final Office Action dated Jan. 19, 2018 for U.S. Appl. No. 15/724,029, 20 pages.
Non-Final Office Action dated Feb. 21, 2018 for U.S. Appl. No. 15/725,026, 10 pages.
Notice of Allowance dated Jun. 21, 2018 for U.S. Appl. No. 15/725,026, 5 pages.
Notice of Allowance dated May 23, 2018 for U.S. Appl. No. 15/724,029, 5 pages.
Ming et al., "Understanding Hidden Memories of Recurrent Neural Networks" arXiv:1710.10777v1, Oct. 30, 2017, 16 pages.
Strobelt, et al., "LSTMVis: A Tool for Visual Analysis of Hidden State Dynamics in Recurrent Neural Networks" IEEE Transactions on Visualization and Computer Graphics, arXiv:1606.07461v2, Oct. 30, 2017, 10 pages.
Ming, et al., "RNNVis: Understanding Hidden Memories of Recurrent Neural Networks" retrieved via the internet at http://www.myaooo.com/projects/rnnvis/, Jun. 5, 2018, 5 pages.
Olah, "Understanding LSTM Networks" retrieved via the internet at http://colah.github.io/posts/2015-08-Understanding-LSTMs/, Jun. 19, 2018, 15 pages.

-- PRIOR ART --

INTERACTIVE VISUALIZATIONS FOR A RECURRENT NEURAL NETWORK

REFERENCE TO RELATED APPLICATION

This claims the benefit of priority under 35 U.S.C. § 119(e) to U.S. Provisional Patent Application No. 62/679,932, titled "Visualizing Recurrent Neural Nets for Text Analytics" and filed Jun. 3, 2018, and under 35 U.S.C. § 120 as a continuation-in-part of co-pending U.S. patent application Ser. No. 15/725,026, titled "Visualizing Convolutional Neural Networks" and filed on Oct. 4, 2017, which claims priority under 35 U.S.C. § 119(e) to U.S. Provisional Patent Application No. 62/486,112, titled "Visualizing Convolutional Deep Neural Networks" and filed Apr. 17, 2017, and under 35 U.S.C. § 120 as a continuation-in-part of co-pending U.S. patent application Ser. No. 15/584,984, titled "Visualizing Deep Neural Networks" and filed on May 2, 2017, now U.S. Pat. No. 9,934,462 issued Apr. 3, 2018, which claims the benefit of priority under 35 U.S.C. § 119(e) to U.S. Provisional Patent Application No. 62/439,968, titled "Visualizing Deep Neural Networks" and filed Dec. 29, 2016, and to U.S. Provisional Patent Application No. 62/403,944, titled "Visualizing Deep Neural Networks" and filed Oct. 4, 2016, the entirety of each of which is hereby incorporated by reference herein.

TECHNICAL FIELD

The present disclosure relates generally to graphical user interfaces. More specifically, but not by way of limitation, this disclosure relates to graphical user interfaces for visualizing recurrent neural networks.

BACKGROUND

A neural network can be represented as two or more layers of interconnected "neurons" (or "nodes") that can exchange data between one another. The connections between the neurons can have numeric weights that can be tuned based on experience. Such tuning can make neural networks adaptive and capable of "learning."

A deep neural network is a neural network that has one or more hidden layers of neurons between an input layer and an output layer of the neural network. Such layers between the input layer and the output layer may be referred to as "hidden" because they may not be directly observable in the normal functioning of the neural network. A deep neural network can include any number of hidden layers, and each hidden layer can include any number of neurons.

One type of deep neural network is a recurrent neural network (RNN), such as the RNN 1500 shown in FIG. 15. As shown, the RNN 1500 includes an input layer 1502, a hidden layer 1504, and an output layer 1506. The hidden layer 1504 has one or more feedback loops. These feedback loops can provide RNNs with a type of "memory," in which past outputs from the hidden layer 1504 can inform future outputs from the hidden layer 1504. Specifically, each feedback loop can provide an output from the hidden layer 1504 at a previous time-step (e.g., $t_{-1}$) back to the hidden layer 1504 as input for the current time-step (e.g., to) to inform the output at the current time-step. This can enable RNNs to recurrently process sequence data (e.g., data that exists in an ordered sequence, like a sentence having a sequence of words or a video having a sequence of images) over a sequence of time steps.

One type of RNN is a Long Short-Term Memory (LSTM) neural network, such as the LSTM neural network 1600 shown in FIG. 16. As shown, the LSTM neural network 1600 includes input nodes (e.g., $X_0$-$X_3$), a fully connected RNN, and output nodes (e.g., $H_0$-$H_3$). The LSTM neural network 1600 can include one or more memory cells, such as memory cell 1602. The memory cell 1602 can enable the LSTM neural network 1600 to have a longer memory than other types of RNNs. The memory cell 1602 can include one or more gates. Each gate can include a sigmoid neural-network layer (e.g., depicted in memory cell 1602 with a "σ" symbol) and/or a pointwise multiplication. Typically, the memory cell 1602 includes a self-recurrent connection, an input gate, a forget gate, an output gate, or any combination of these. Examples of these gates include input gate 1606, forget gate 1604, and output gate 1608 shown in FIG. 16. The input gate 1606 can selectively control the input to the memory cell 1602. The output gate 1608 can selectively control the output of the memory cell 1602. The forget gate 1604 can control whether the memory cell 1602 remembers information from previous time-steps when processing sequence data. For example, the forget gate 1604 can control whether the memory cell 1602 should save the previous state of the memory cell 1602 for a period of time or forget the previous state of the memory cell 1602.

SUMMARY

One example of the present disclosure includes a system having a processing device and a memory including instructions that are executable by the processing device. The instructions can cause the processing device to receive a plurality of vectors indicating values of a plurality of nodes in a gate of a recurrent neural network resulting from processing data at the gate during a sequence of time steps. Each vector among the plurality of vectors can include a respective value for each respective node among the plurality of nodes at a respective time step within the sequence of time steps. The instructions can cause the processing device to group the plurality of nodes into a plurality of clusters by applying a clustering method to the values of the plurality of nodes. The clustering method can involve comparing how the respective value for each respective node changed during the sequence of time steps and assigning nodes with like changes during the sequence of time steps to a common cluster among the plurality of clusters. The instructions can cause the processing device to generate a first graphical element visually indicating how the respective values of the nodes in a cluster among the plurality of clusters changed during the sequence of time steps. The instructions can cause the processing device to determine a reference value based on multiple values for multiple nodes in the cluster. The instructions can cause the processing device to generate a second graphical element visually representing how the respective values of the nodes in the cluster each relate to the reference value. The instructions can cause the processing device to transmit a display communication to a display device for causing the display device to output a graphical user interface having the first graphical element and the second graphical element.

Another example of the present disclosure includes a non-transitory computer-readable medium having program code that is executable by a processing device. The program code can cause the processing device to receive a plurality of vectors indicating values of a plurality of nodes in a gate of a recurrent neural network resulting from processing data at the gate during a sequence of time steps. Each vector among the plurality of vectors can include a respective value for each respective node among the plurality of nodes at a respective time step within the sequence of time steps. The program code can cause the processing device to group the plurality of nodes into a plurality of clusters by applying a clustering method to the values of the plurality of nodes. The clustering method can involve comparing how the respective value for each respective node changed during the sequence of time steps and assigning nodes with like changes during the sequence of time steps to a common cluster among the plurality of clusters. The program code can cause the processing device to generate a first graphical element visually indicating how the respective values of the nodes in a cluster among the plurality of clusters changed during the sequence of time steps. The program code can cause the processing device to determine a reference value based on multiple values for multiple nodes in the cluster. The program code can cause the processing device to generate a second graphical element visually representing how the respective values of the nodes in the cluster each relate to the reference value. The program code can cause the processing device to transmit a display communication to a display device for causing the display device to output a graphical user interface having the first graphical element and the second graphical element.

Yet another example of the present disclosure includes a method involving receiving a plurality of vectors indicating values of a plurality of nodes in a gate of a recurrent neural network resulting from processing data at the gate during a sequence of time steps. Each vector among the plurality of vectors can include a respective value for each respective node among the plurality of nodes at a respective time step within the sequence of time steps. The method can involve grouping the plurality of nodes into a plurality of clusters by applying a clustering method to the values of the plurality of nodes. The clustering method can involve comparing how the respective value for each respective node changed during the sequence of time steps and assigning nodes with like changes during the sequence of time steps to a common cluster among the plurality of clusters. The method can involve generating a first graphical element visually indicating how the respective values of the nodes in a cluster among the plurality of clusters changed during the sequence of time steps. The method can involve determining a reference value based on multiple values for multiple nodes in the cluster. The method can involve generating a second graphical element visually representing how the respective values of the nodes in the cluster each relate to the reference value. The method can involve transmitting a display communication to a display device for causing the display device to output a graphical user interface having the first graphical element and the second graphical element. Some or all of the method steps can be implemented by a processing device.

This summary is not intended to identify key or essential features of the claimed subject matter, nor is it intended to be used in isolation to determine the scope of the claimed subject matter. The subject matter should be understood by reference to appropriate portions of the entire specification, any or all drawings, and each claim.

The foregoing, together with other features and examples, will become more apparent upon referring to the following specification, claims, and accompanying drawings.

BRIEF DESCRIPTION OF THE DRAWINGS

The present disclosure is described in conjunction with the appended figures.

Figure 1:
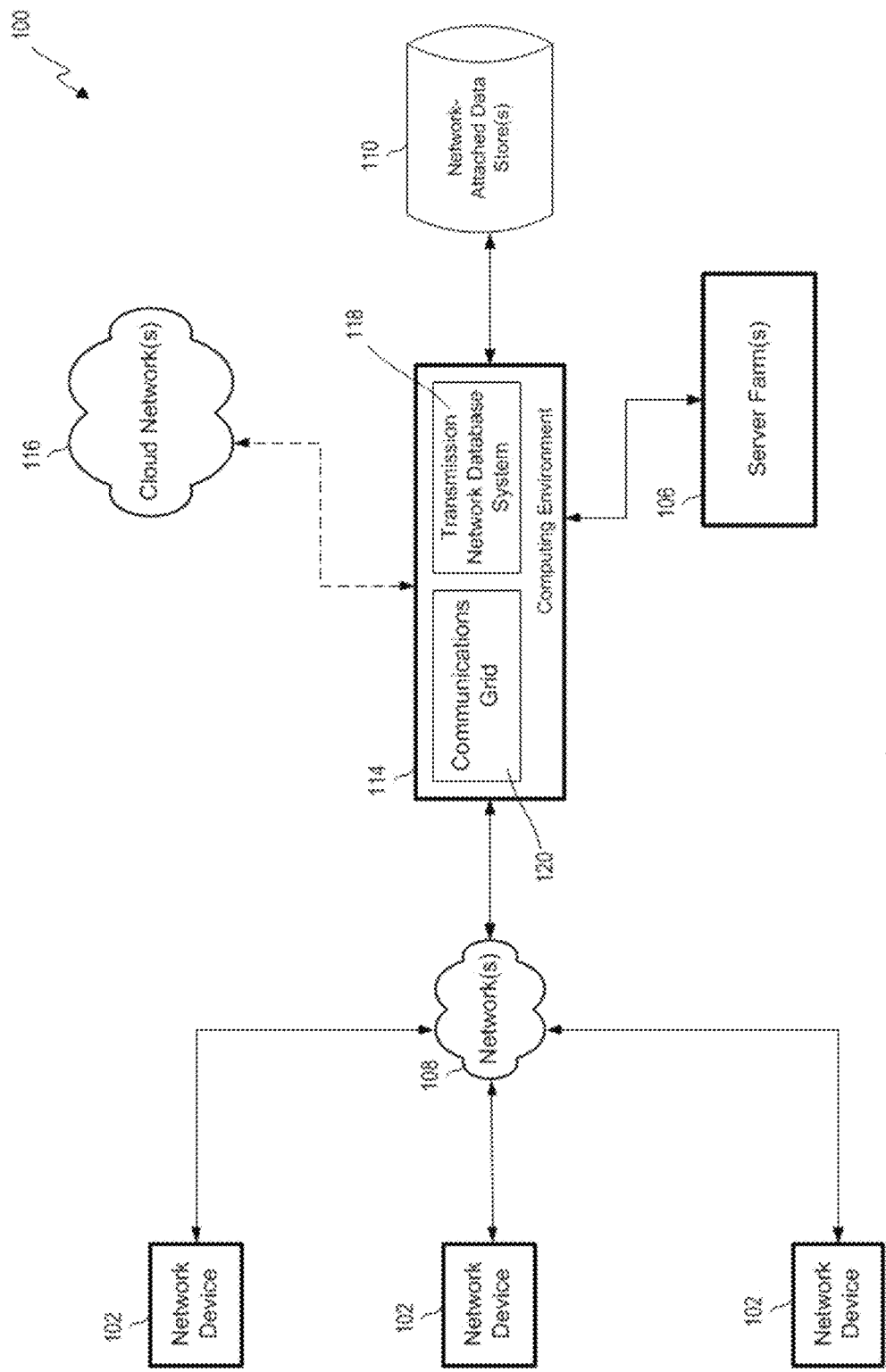
FIG. 1 is a block diagram of an example of the hardware components of a computing system according to some aspects.

In the appended figures, similar components or features can have the same reference label. Further, various components of the same type can be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION

Certain aspects and features of the present disclosure relate to a graphical user interface (GUI) system that is specifically tailored for visualizing aspects of a recurrent neural network (RNN). The GUI system can enable a user to select a particular gate of the RNN to visualize and responsively provide detailed information about that gate in a GUI. For example, the GUI system can present a graph that visually depicts how the values of nodes forming that gate changed over time. The GUI system can also visually present a cluster map. A cluster map can include a visual matrix (e.g., rows and columns) of cells, where each cell corresponds to one of the nodes in the gate and is color coded to represent a difference between the node's value and a reference-value (e.g., an average of several node-values). In some examples, the GUI system provides various interactive elements that enable a user to more deeply explore the gate of the RNN. For example, the GUI system can detect an interaction with a point on the graph corresponding to one of the nodes in the gate and responsively display a visual window that has additional information about the node.

The abovementioned features can enable a user to discover and explore characteristics of a RNN that are currently not well understood. Presently, RNNs are often considered a "black box." For example, although the procedure to train and use RNNs may be known, a deeper understanding of the inner workings of RNNs is often lacking. And, as RNNs grow in size, more parameters accumulate and it can become more difficult to understand what the RNN is doing to produce its final results. But some examples of the present disclosure provide an intuitive, easy-to-use GUI that can enable users to obtain a better understanding of how a RNN is operating (particularly at the gate level), why the RNN is making certain decisions, and how the RNN produces final results. This may lead to a better understanding of how to train and build RNNs that are more efficient, robust, and accurate. For example, information displayed in the GUI may enable a designer to determine: (i) how a RNN returns a certain output; (ii) how input values move through nodes and links in the RNN to generate the output; and (iii) how changing the values of the input affect movement through the RNN and the output value returned. As some particular examples, a designer of a RNN can review the node values in a forget gate for certain patterns that may indicate problems with how the RNN was trained or how the forget gate is operating (e.g., that information that should be saved is being forgotten, or that information that should be forgotten is being saved). The designer may be able to address these problems by re-training the RNN or tuning the forget gate's characteristics, respectively. But without the visualizations provided in some examples, the designer may be unable to even identify the problem.

Additionally, typical RNNs are large and require excessive amounts of memory and processing power to execute. But the GUI of the present disclosure can provide information that enables a designer to optimize a RNN to reduce (i) the number of processing cycles executed by the RNN, (ii) the amount of memory consumed by the RNN, (iii) the amount of memory accesses performed by the RNN, (iv) or any combination of these. As a particular example, a designer of a RNN can use the GUI to determine that certain nodes of a gate produce repetitive results or are otherwise extraneous. So, the designer can remove these nodes to reduce the disk size of the RNN, the amount of unnecessary processing performed by executing the RNN, and the amount of memory (e.g., RAM) consumed by executing the RNN.

These illustrative examples are given to introduce the reader to the general subject matter discussed here and are not intended to limit the scope of the disclosed concepts. The following sections describe various additional features and examples with reference to the drawings in which like numerals indicate like elements but, like the illustrative examples, should not be used to limit the present disclosure.

FIGS. 1-10 depict examples of systems and methods usable for visualizing recurrent neural networks according to some aspects. For example, FIG. 1 is a block diagram of an example of the hardware components of a computing system according to some aspects. Data transmission network 100 is a specialized computer system that may be used for processing large amounts of data where a large number of computer processing cycles are required.

Data transmission network 100 may also include computing environment 114. Computing environment 114 may be a specialized computer or other machine that processes the data received within the data transmission network 100. The computing environment 114 may include one or more other systems. For example, computing environment 114 may include a database system 118 or a communications grid 120. The computing environment 114 can include one or more processing devices (e.g., distributed over one or more networks or otherwise in communication with one another) that, in some examples, can collectively be referred to as a processor or a processing device.

Data transmission network 100 also includes one or more network devices 102. Network devices 102 may include client devices that can communicate with computing environment 114. For example, network devices 102 may send data to the computing environment 114 to be processed, may send communications to the computing environment 114 to control different aspects of the computing environment or the data it is processing, among other reasons. Network devices 102 may interact with the computing environment 114 through a number of ways, such as, for example, over one or more networks 108.

In some examples, network devices 102 may provide a large amount of data, either all at once or streaming over a period of time (e.g., using event stream processing (ESP)), to the computing environment 114 via networks 108. For example, the network devices 102 can transmit electronic messages for use in visualizing recurrent neural networks, all at once or streaming over a period of time, to the computing environment 114 via networks 108.

The network devices 102 may include network computers, sensors, databases, or other devices that may transmit or otherwise provide data to computing environment 114. For example, network devices 102 may include local area network devices, such as routers, hubs, switches, or other computer networking devices. These devices may provide a variety of stored or generated data, such as network data or data specific to the network devices 102 themselves. Network devices 102 may also include sensors that monitor their environment or other devices to collect data regarding that environment or those devices, and such network devices 102 may provide data they collect over time. Network devices 102 may also include devices within the internet of things, such as devices within a home automation network. Some of these devices may be referred to as edge devices, and may involve edge-computing circuitry. Data may be transmitted by network devices 102 directly to computing environment 114 or to network-attached data stores, such as network-attached data stores 110 for storage so that the data may be retrieved later by the computing environment 114 or other portions of data transmission network 100. For example, the network devices 102 can transmit data usable for visualizing recurrent neural networks to a network-attached data store 110 for storage. The computing environment 114 may later retrieve the data from the network-attached data store 110 and use the data to visualizing recurrent neural networks.

Network-attached data stores 110 can store data to be processed by the computing environment 114 as well as any intermediate or final data generated by the computing system in non-volatile memory. But in certain examples, the configuration of the computing environment 114 allows its operations to be performed such that intermediate and final data results can be stored solely in volatile memory (e.g., RAM), without a requirement that intermediate or final data results be stored to non-volatile types of memory (e.g., disk). This can be useful in certain situations, such as when the computing environment 114 receives ad hoc queries from a user and when responses, which are generated by processing large amounts of data, need to be generated dynamically (e.g., on the fly). In this situation, the computing environment 114 may be configured to retain the processed information within memory so that responses can be generated for the user at different levels of detail as well as allow a user to interactively query against this information.

Network-attached data stores 110 may store a variety of different types of data organized in a variety of different ways and from a variety of different sources. For example, network-attached data stores may include storage other than primary storage located within computing environment 114 that is directly accessible by processors located therein. Network-attached data stores may include secondary, tertiary or auxiliary storage, such as large hard drives, servers, virtual memory, among other types. Storage devices may include portable or non-portable storage devices, optical storage devices, and various other mediums capable of storing, containing data. A machine-readable storage medium or computer-readable storage medium may include a non-transitory medium in which data can be stored and that does not include carrier waves or transitory electronic communications. Examples of a non-transitory medium may include, for example, a magnetic disk or tape, optical storage media such as compact disk or digital versatile disk, flash memory, memory or memory devices. A computer-program product may include code or machine-executable instructions that may represent a procedure, a function, a subprogram, a program, a routine, a subroutine, a module, a software package, a class, or any combination of instructions, data structures, or program statements. A code segment may be coupled to another code segment or a hardware circuit by passing or receiving information, data, arguments, parameters, or memory contents. Information, arguments, parameters, data, etc. may be passed, forwarded, or transmitted via any suitable means including memory sharing, message passing, token passing, network transmission, among others. Furthermore, the data stores may hold a variety of different types of data. For example, network-attached data stores 110 may hold unstructured (e.g., raw) data.

The unstructured data may be presented to the computing environment 114 in different forms such as a flat file or a conglomerate of data records, and may have data values and accompanying time stamps. The computing environment 114 may be used to analyze the unstructured data in a variety of ways to determine the best way to structure (e.g., hierarchically) that data, such that the structured data is tailored to a type of further analysis that a user wishes to perform on the data. For example, after being processed, the unstructured time-stamped data may be aggregated by time (e.g., into daily time period units) to generate time series data or structured hierarchically according to one or more dimensions (e.g., parameters, attributes, or variables). For example, data may be stored in a hierarchical data structure, such as a relational online analytical processing (ROLAP) or multidimensional online analytical processing (MOLAP) database, or may be stored in another tabular form, such as in a flat-hierarchy form.

Data transmission network 100 may also include one or more server farms 106. Computing environment 114 may route select communications or data to the sever farms 106 or one or more servers within the server farms 106. Server farms 106 can be configured to provide information in a predetermined manner. For example, server farms 106 may access data to transmit in response to a communication. Server farms 106 may be separately housed from each other device within data transmission network 100, such as computing environment 114, or may be part of a device or system.

Server farms 106 may host a variety of different types of data processing as part of data transmission network 100. Server farms 106 may receive a variety of different data from network devices, from computing environment 114, from cloud network 116, or from other sources. The data may have been obtained or collected from one or more websites, sensors, as inputs from a control database, or may have been received as inputs from an external system or device. Server farms 106 may assist in processing the data by turning raw data into processed data based on one or more rules implemented by the server farms. For example, sensor data may be analyzed to determine changes in an environment over time or in real-time.

Data transmission network 100 may also include one or more cloud networks 116. Cloud network 116 may include a cloud infrastructure system that provides cloud services. In certain examples, services provided by the cloud network 116 may include a host of services that are made available to users of the cloud infrastructure system on demand. Cloud network 116 is shown in FIG. 1 as being connected to computing environment 114 (and therefore having computing environment 114 as its client or user), but cloud network 116 may be connected to or utilized by any of the devices in FIG. 1. Services provided by the cloud network 116 can dynamically scale to meet the needs of its users. The cloud network 116 may include one or more computers, servers, or systems. In some examples, the computers, servers, or systems that make up the cloud network 116 are different from the user's own on-premises computers, servers, or systems. For example, the cloud network 116 may host an application, and a user may, via a communication network such as the Internet, order and use the application on demand. In some examples, the cloud network 116 may host an application for visualizing recurrent neural networks.

While each device, server, and system in FIG. 1 is shown as a single device, multiple devices may instead be used. For example, a set of network devices can be used to transmit various communications from a single user, or remote server 140 may include a server stack. As another example, data may be processed as part of computing environment 114.

Each communication within data transmission network 100 (e.g., between client devices, between a device and connection management system 150, between server farms 106 and computing environment 114, or between a server and a device) may occur over one or more networks 108. Networks 108 may include one or more of a variety of different types of networks, including a wireless network, a wired network, or a combination of a wired and wireless network. Examples of suitable networks include the Internet, a personal area network, a local area network (LAN), a wide area network (WAN), or a wireless local area network (WLAN). A wireless network may include a wireless interface or combination of wireless interfaces. As an example, a network in the one or more networks 108 may include a short-range communication channel, such as a Bluetooth or a Bluetooth Low Energy channel. A wired network may include a wired interface. The wired or wireless networks may be implemented using routers, access points, bridges, gateways, or the like, to connect devices in the network 108. The networks 108 can be incorporated entirely within or can include an intranet, an extranet, or a combination thereof. In one example, communications between two or more systems or devices can be achieved by a secure communications protocol, such as secure sockets layer (SSL) or transport layer security (TLS). In addition, data or transactional details may be encrypted.

Some aspects may utilize the Internet of Things (IoT), where things (e.g., machines, devices, phones, sensors) can be connected to networks and the data from these things can be collected and processed within the things or external to the things. For example, the IoT can include sensors in many different devices, and high value analytics can be applied to identify hidden relationships and drive increased efficiencies. This can apply to both big data analytics and real-time (e.g., ESP) analytics.

As noted, computing environment 114 may include a communications grid 120 and a transmission network database system 118. Communications grid 120 may be a grid-based computing system for processing large amounts of data. The transmission network database system 118 may be for managing, storing, and retrieving large amounts of data that are distributed to and stored in the one or more network-attached data stores 110 or other data stores that reside at different locations within the transmission network database system 118. The computing nodes in the communications grid 120 and the transmission network database system 118 may share the same processor hardware, such as processors that are located within computing environment 114.

In some examples, the computing environment 114, a network device 102, or both can implement one or more processes for visualizing recurrent neural networks. For example, the computing environment 114, a network device 102, or both can implement one or more versions of the processes discussed with respect to any of the figures.

Figure 2:
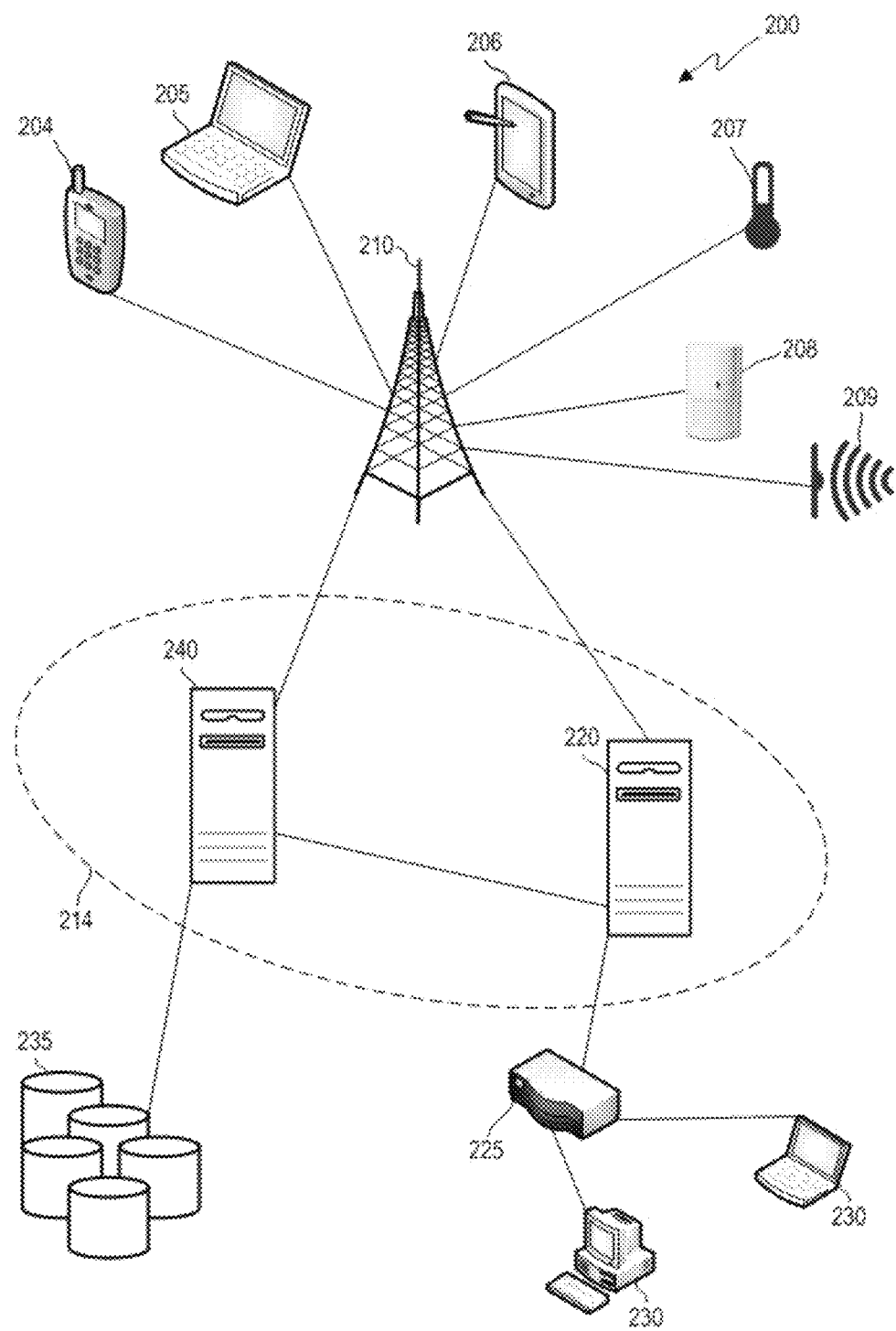
FIG. 2 is an example of devices that can communicate with each other over an exchange system and via a network according to some aspects.

FIG. 2 is an example of devices that can communicate with each other over an exchange system and via a network according to some aspects. As noted, each communication within data transmission network 100 may occur over one or more networks. System 200 includes a network device 204 configured to communicate with a variety of types of client devices, for example client devices 230, over a variety of types of communication channels.

As shown in FIG. 2, network device 204 can transmit a communication over a network (e.g., a cellular network via a base station 210). In some examples, the communication can include times series data. The communication can be routed to another network device, such as network devices 205-209, via base station 210. The communication can also be routed to computing environment 214 via base station 210. In some examples, the network device 204 may collect data either from its surrounding environment or from other network devices (such as network devices 205-209) and transmit that data to computing environment 214.

Although network devices 204-209 are shown in FIG. 2 as a mobile phone, laptop computer, tablet computer, temperature sensor, motion sensor, and audio sensor respectively, the network devices may be or include sensors that are sensitive to detecting aspects of their environment. For example, the network devices may include sensors such as water sensors, power sensors, electrical current sensors, chemical sensors, optical sensors, pressure sensors, geographic or position sensors (e.g., GPS), velocity sensors, acceleration sensors, flow rate sensors, among others. Examples of characteristics that may be sensed include force, torque, load, strain, position, temperature, air pressure, fluid flow, chemical properties, resistance, electromagnetic fields, radiation, irradiance, proximity, acoustics, moisture, distance, speed, vibrations, acceleration, electrical potential, and electrical current, among others. The sensors may be mounted to various components used as part of a variety of different types of systems. The network devices may detect and record data related to the environment that it monitors, and transmit that data to computing environment 214.

The network devices 204-209 may also perform processing on data it collects before transmitting the data to the computing environment 214, or before deciding whether to transmit data to the computing environment 214. For example, network devices 204-209 may determine whether data collected meets certain rules, for example by comparing data or values calculated from the data and comparing that data to one or more thresholds. The network devices 204-209 may use this data or comparisons to determine if the data is to be transmitted to the computing environment 214 for further use or processing. In some examples, the network devices 204-209 can pre-process the data prior to transmitting the data to the computing environment 214. For example, the network devices 204-209 can reformat the data before transmitting the data to the computing environment 214 for further processing (e.g., analyzing the data to visualize a recurrent neural network).

Computing environment 214 may include machines 220, 240. Although computing environment 214 is shown in FIG. 2 as having two machines 220, 240, computing environment 214 may have only one machine or may have more than two machines. The machines 220, 240 that make up computing environment 214 may include specialized computers, servers, or other machines that are configured to individually or collectively process large amounts of data. The computing environment 214 may also include storage devices that include one or more databases of structured data, such as data organized in one or more hierarchies, or unstructured data. The databases may communicate with the processing devices within computing environment 214 to distribute data to them. Since network devices may transmit data to computing environment 214, that data may be received by the computing environment 214 and subsequently stored within those storage devices. Data used by computing environment 214 may also be stored in data stores 235, which may also be a part of or connected to computing environment 214.

Computing environment 214 can communicate with various devices via one or more routers 225 or other inter-network or intra-network connection components. For example, computing environment 214 may communicate with client devices 230 via one or more routers 225. Computing environment 214 may collect, analyze or store data from or pertaining to communications, client device operations, client rules, or user-associated actions stored at one or more data stores 235. Such data may influence communication routing to the devices within computing environment 214, how data is stored or processed within computing environment 214, among other actions.

Notably, various other devices can further be used to influence communication routing or processing between devices within computing environment 214 and with devices outside of computing environment 214. For example, as shown in FIG. 2, computing environment 214 may include a machine 240 that is a web server. Computing environment 214 can retrieve data of interest, such as client information (e.g., product information, client rules, etc.), technical product details, news, blog posts, e-mails, forum posts, electronic documents, social media posts (e.g., Twitter™ posts or Facebook™ posts), time series data, and so on.

In addition to computing environment 214 collecting data (e.g., as received from network devices, such as sensors, and client devices or other sources) to be processed as part of a big data analytics project, it may also receive data in real time as part of a streaming analytics environment. As noted, data may be collected using a variety of sources as communicated via different kinds of networks or locally. Such data may be received on a real-time streaming basis. For example, network devices 204-209 may receive data periodically and in real time from a web server or other source. Devices within computing environment 214 may also perform pre-analysis on data it receives to determine if the data received should be processed as part of an ongoing project. For example, as part of a project for visualizing recurrent neural networks using data, the computing environment 214 can perform a pre-analysis of the data. The pre-analysis can include determining whether the data is in a correct format for visualizing recurrent neural networks using the data and, if not, reformatting the data into the correct format.

Figure 3:
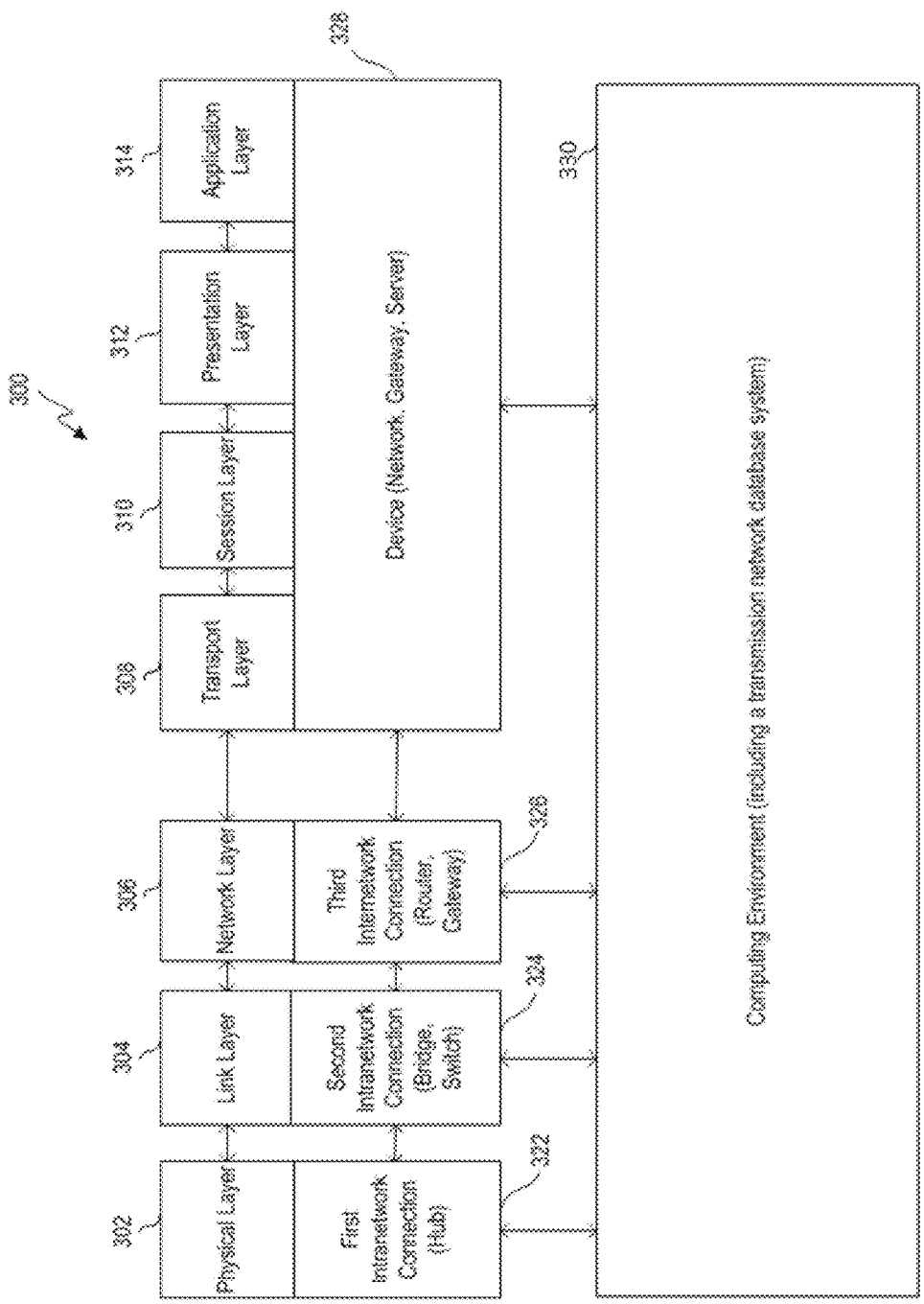
FIG. 3 is a block diagram of a model of an example of a communications protocol system according to some aspects.

FIG. 3 is a block diagram of a model of an example of a communications protocol system according to some aspects. More specifically, FIG. 3 identifies operation of a computing environment in an Open Systems Interaction model that corresponds to various connection components. The model 300 shows, for example, how a computing environment, such as computing environment (or computing environment 214 in FIG. 2) may communicate with other devices in its network, and control how communications between the computing environment and other devices are executed and under what conditions.

The model 300 can include layers 302-314. The layers 302-314 are arranged in a stack. Each layer in the stack serves the layer one level higher than it (except for the application layer, which is the highest layer), and is served by the layer one level below it (except for the physical layer 302, which is the lowest layer). The physical layer 302 is the lowest layer because it receives and transmits raw bites of data, and is the farthest layer from the user in a communications system. On the other hand, the application layer is the highest layer because it interacts directly with a software application.

As noted, the model 300 includes a physical layer 302. Physical layer 302 represents physical communication, and can define parameters of that physical communication. For example, such physical communication may come in the form of electrical, optical, or electromagnetic communications. Physical layer 302 also defines protocols that may control communications within a data transmission network.

Link layer 304 defines links and mechanisms used to transmit (e.g., move) data across a network. The link layer manages node-to-node communications, such as within a grid-computing environment. Link layer 304 can detect and correct errors (e.g., transmission errors in the physical layer 302). Link layer 304 can also include a media access control (MAC) layer and logical link control (LLC) layer.

Network layer 306 can define the protocol for routing within a network. In other words, the network layer coordinates transferring data across nodes in a same network (e.g., such as a grid-computing environment). Network layer 306 can also define the processes used to structure local addressing within the network.

Transport layer 308 can manage the transmission of data and the quality of the transmission or receipt of that data. Transport layer 308 can provide a protocol for transferring data, such as, for example, a Transmission Control Protocol (TCP). Transport layer 308 can assemble and disassemble data frames for transmission. The transport layer can also detect transmission errors occurring in the layers below it.

Session layer 310 can establish, maintain, and manage communication connections between devices on a network. In other words, the session layer controls the dialogues or nature of communications between network devices on the network. The session layer may also establish checkpointing, adjournment, termination, and restart procedures.

Presentation layer 312 can provide translation for communications between the application and network layers. In other words, this layer may encrypt, decrypt or format data based on data types known to be accepted by an application or network layer.

Application layer 314 interacts directly with software applications and end users, and manages communications between them. Application layer 314 can identify destinations, local resource states or availability or communication content or formatting using the applications.

For example, a communication link can be established between two devices on a network. One device can transmit an analog or digital representation of an electronic message that includes a data set to the other device. The other device can receive the analog or digital representation at the physical layer 302. The other device can transmit the data associated with the electronic message through the remaining layers 304-314. The application layer 314 can receive data associated with the electronic message. The application layer 314 can identify one or more applications, such as an application for visualizing recurrent neural networks, to which to transmit data associated with the electronic message. The application layer 314 can transmit the data to the identified application.

Intra-network connection components 322, 324 can operate in lower levels, such as physical layer 302 and link layer 304, respectively. For example, a hub can operate in the physical layer, a switch can operate in the physical layer, and a router can operate in the network layer. Inter-network connection components 326, 328 are shown to operate on higher levels, such as layers 306-314. For example, routers can operate in the network layer and network devices can operate in the transport, session, presentation, and application layers.

A computing environment 330 can interact with or operate on, in various examples, one, more, all or any of the various layers. For example, computing environment 330 can interact with a hub (e.g., via the link layer) to adjust which devices the hub communicates with. The physical layer 302 may be served by the link layer 304, so it may implement such data from the link layer 304. For example, the computing environment 330 may control which devices from which it can receive data. For example, if the computing environment 330 knows that a certain network device has turned off, broken, or otherwise become unavailable or unreliable, the computing environment 330 may instruct the hub to prevent any data from being transmitted to the computing environment 330 from that network device. Such a process may be beneficial to avoid receiving data that is inaccurate or that has been influenced by an uncontrolled environment. As another example, computing environment 330 can communicate with a bridge, switch, router or gateway and influence which device within the system (e.g., system 200) the component selects as a destination. In some examples, computing environment 330 can interact with various layers by exchanging communications with equipment operating on a particular layer by routing or modifying existing communications. In another example, such as in a grid-computing environment, a node may determine how data within the environment should be routed (e.g., which node should receive certain data) based on certain parameters or information provided by other layers within the model.

The computing environment 330 may be a part of a communications grid environment, the communications of which may be implemented as shown in the protocol of FIG. 3. For example, referring back to FIG. 2, one or more of machines 220 and 240 may be part of a communications grid-computing environment. A gridded computing environment may be employed in a distributed system with non-interactive workloads where data resides in memory on the machines, or compute nodes. In such an environment, analytic code, instead of a database management system, can control the processing performed by the nodes. Data is co-located by pre-distributing it to the grid nodes, and the analytic code on each node loads the local data into memory. Each node may be assigned a particular task, such as a portion of a processing project, or to organize or control other nodes within the grid. For example, each node may be assigned a portion of a processing task for visualizing recurrent neural networks.

Figure 4:
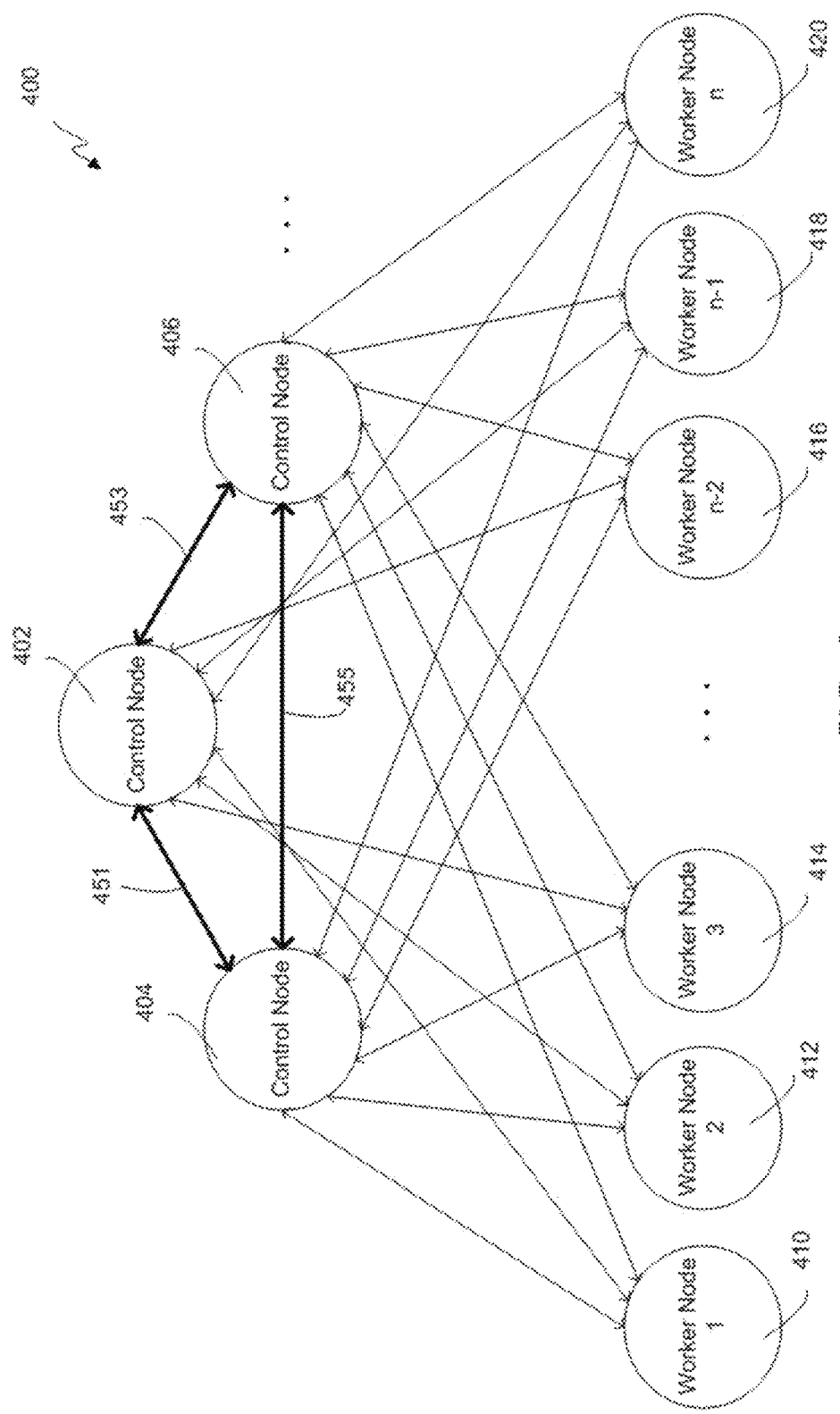
FIG. 4 is a hierarchical diagram of an example of a communications grid computing system including a variety of control and worker nodes according to some aspects.

FIG. 4 is a hierarchical diagram of an example of a communications grid computing system 400 including a variety of control and worker nodes according to some aspects. Communications grid computing system 400 includes three control nodes and one or more worker nodes. Communications grid computing system 400 includes control nodes 402, 404, and 406. The control nodes are communicatively connected via communication paths 451, 453, and 455. The control nodes 402-406 may transmit information (e.g., related to the communications grid or notifications) to and receive information from each other. Although communications grid computing system 400 is shown in FIG. 4 as including three control nodes, the communications grid may include more or less than three control nodes.

Communications grid computing system 400 (which can be referred to as a "communications grid") also includes one or more worker nodes. Shown in FIG. 4 are six worker nodes 410-420. Although FIG. 4 shows six worker nodes, a communications grid can include more or less than six worker nodes. The number of worker nodes included in a communications grid may be dependent upon how large the project or data set is being processed by the communications grid, the capacity of each worker node, the time designated for the communications grid to complete the project, among others. Each worker node within the communications grid computing system 400 may be connected (wired or wirelessly, and directly or indirectly) to control nodes 402-406. Each worker node may receive information from the control nodes (e.g., an instruction to perform work on a project) and may transmit information to the control nodes (e.g., a result from work performed on a project). Furthermore, worker nodes may communicate with each other directly or indirectly. For example, worker nodes may transmit data between each other related to a job being performed or an individual task within a job being performed by that worker node. In some examples, worker nodes may not be connected (communicatively or otherwise) to certain other worker nodes. For example, a worker node 410 may only be able to communicate with a particular control node 402. The worker node 410 may be unable to communicate with other worker nodes 412-420 in the communications grid, even if the other worker nodes 412-420 are controlled by the same control node 402.

A control node 402-406 may connect with an external device with which the control node 402-406 may communicate (e.g., a communications grid user, such as a server or computer, may connect to a controller of the grid). For example, a server or computer may connect to control nodes 402-406 and may transmit a project or job to the node, such as a project or job related to visualizing recurrent neural networks. The project may include the data set. The data set may be of any size and can include a time series. Once the control node 402-406 receives such a project including a large data set, the control node may distribute the data set or projects related to the data set to be performed by worker nodes. Alternatively, for a project including a large data set, the data set may be receive or stored by a machine other than a control node 402-406 (e.g., a Hadoop data node).

Control nodes 402-406 can maintain knowledge of the status of the nodes in the grid (e.g., grid status information), accept work requests from clients, subdivide the work across worker nodes, and coordinate the worker nodes, among other responsibilities. Worker nodes 412-420 may accept work requests from a control node 402-406 and provide the control node with results of the work performed by the worker node. A grid may be started from a single node (e.g., a machine, computer, server, etc.). This first node may be assigned or may start as the primary control node 402 that will control any additional nodes that enter the grid.

When a project is submitted for execution (e.g., by a client or a controller of the grid) it may be assigned to a set of nodes. After the nodes are assigned to a project, a data structure (e.g., a communicator) may be created. The communicator may be used by the project for information to be shared between the project code running on each node. A communication handle may be created on each node. A handle, for example, is a reference to the communicator that is valid within a single process on a single node, and the handle may be used when requesting communications between nodes.

A control node, such as control node 402, may be designated as the primary control node. A server, computer or other external device may connect to the primary control node. Once the control node 402 receives a project, the primary control node may distribute portions of the project to its worker nodes for execution. For example, a project for visualizing recurrent neural networks can be initiated on communications grid computing system 400. A primary control node can control the work to be performed for the project in order to complete the project as requested or instructed. The primary control node may distribute work to the worker nodes 412-420 based on various factors, such as which subsets or portions of projects may be completed most efficiently and in the correct amount of time. For example, a worker node 412 may generate a visualization of a recurrent neural network using at least a portion of data that is already local (e.g., stored on) the worker node. The primary control node also coordinates and processes the results of the work performed by each worker node 412-420 after each worker node 412-420 executes and completes its job. For example, the primary control node may receive a result from one or more worker nodes 412-420, and the primary control node may organize (e.g., collect and assemble) the results received and compile them to produce a complete result for the project received from the end user.

Any remaining control nodes, such as control nodes 404, 406, may be assigned as backup control nodes for the project. In an example, backup control nodes may not control any portion of the project. Instead, backup control nodes may serve as a backup for the primary control node and take over as primary control node if the primary control node were to fail. If a communications grid were to include only a single control node 402, and the control node 402 were to fail (e.g., the control node is shut off or breaks) then the communications grid as a whole may fail and any project or job being run on the communications grid may fail and may not complete. While the project may be run again, such a failure may cause a delay (severe delay in some cases, such as overnight delay) in completion of the project. Therefore, a grid with multiple control nodes 402-406, including a backup control node, may be beneficial.

In some examples, the primary control node may open a pair of listening sockets to add another node or machine to the grid. A socket may be used to accept work requests from clients, and the second socket may be used to accept connections from other grid nodes. The primary control node may be provided with a list of other nodes (e.g., other machines, computers, servers, etc.) that can participate in the grid, and the role that each node can fill in the grid. Upon startup of the primary control node (e.g., the first node on the grid), the primary control node may use a network protocol to start the server process on every other node in the grid. Command line parameters, for example, may inform each node of one or more pieces of information, such as: the role that the node will have in the grid, the host name of the primary control node, the port number on which the primary control node is accepting connections from peer nodes, among others. The information may also be provided in a configuration file, transmitted over a secure shell tunnel, recovered from a configuration server, among others. While the other machines in the grid may not initially know about the configuration of the grid, that information may also be sent to each other node by the primary control node. Updates of the grid information may also be subsequently sent to those nodes.

For any control node other than the primary control node added to the grid, the control node may open three sockets. The first socket may accept work requests from clients, the second socket may accept connections from other grid members, and the third socket may connect (e.g., permanently) to the primary control node. When a control node (e.g., primary control node) receives a connection from another control node, it first checks to see if the peer node is in the list of configured nodes in the grid. If it is not on the list, the control node may clear the connection. If it is on the list, it may then attempt to authenticate the connection. If authentication is successful, the authenticating node may transmit information to its peer, such as the port number on which a node is listening for connections, the host name of the node, information about how to authenticate the node, among other information. When a node, such as the new control node, receives information about another active node, it can check to see if it already has a connection to that other node. If it does not have a connection to that node, it may then establish a connection to that control node.

Any worker node added to the grid may establish a connection to the primary control node and any other control nodes on the grid. After establishing the connection, it may authenticate itself to the grid (e.g., any control nodes, including both primary and backup, or a server or user controlling the grid). After successful authentication, the worker node may accept configuration information from the control node.

When a node joins a communications grid (e.g., when the node is powered on or connected to an existing node on the grid or both), the node is assigned (e.g., by an operating system of the grid) a universally unique identifier (UUID). This unique identifier may help other nodes and external entities (devices, users, etc.) to identify the node and distinguish it from other nodes. When a node is connected to the grid, the node may share its unique identifier with the other nodes in the grid. Since each node may share its unique identifier, each node may know the unique identifier of every other node on the grid. Unique identifiers may also designate a hierarchy of each of the nodes (e.g., backup control nodes) within the grid. For example, the unique identifiers of each of the backup control nodes may be stored in a list of backup control nodes to indicate an order in which the backup control nodes will take over for a failed primary control node to become a new primary control node. But, a hierarchy of nodes may also be determined using methods other than using the unique identifiers of the nodes. For example, the hierarchy may be predetermined, or may be assigned based on other predetermined factors.

The grid may add new machines at any time (e.g., initiated from any control node). Upon adding a new node to the grid, the control node may first add the new node to its table of grid nodes. The control node may also then notify every other control node about the new node. The nodes receiving the notification may acknowledge that they have updated their configuration information.

Primary control node 402 may, for example, transmit one or more communications to backup control nodes 404, 406 (and, for example, to other control or worker nodes 412-420 within the communications grid). Such communications may be sent periodically, at fixed time intervals, between known fixed stages of the project's execution, among other protocols. The communications transmitted by primary control node 402 may be of varied types and may include a variety of types of information. For example, primary control node 402 may transmit snapshots (e.g., status information) of the communications grid so that backup control node 404 always has a recent snapshot of the communications grid. The snapshot or grid status may include, for example, the structure of the grid (including, for example, the worker nodes 410-420 in the communications grid, unique identifiers of the worker nodes 410-420, or their relationships with the primary control node 402) and the status of a project (including, for example, the status of each worker node's portion of the project). The snapshot may also include analysis or results received from worker nodes 410-420 in the communications grid. The backup control nodes 404, 406 may receive and store the backup data received from the primary control node 402. The backup control nodes 404, 406 may transmit a request for such a snapshot (or other information) from the primary control node 402, or the primary control node 402 may send such information periodically to the backup control nodes 404, 406.

As noted, the backup data may allow a backup control node 404, 406 to take over as primary control node if the primary control node 402 fails without requiring the communications grid to start the project over from scratch. If the primary control node 402 fails, the backup control node 404, 406 that will take over as primary control node may retrieve the most recent version of the snapshot received from the primary control node 402 and use the snapshot to continue the project from the stage of the project indicated by the backup data. This may prevent failure of the project as a whole.

A backup control node 404, 406 may use various methods to determine that the primary control node 402 has failed. In one example of such a method, the primary control node 402 may transmit (e.g., periodically) a communication to the backup control node 404, 406 that indicates that the primary control node 402 is working and has not failed, such as a heartbeat communication. The backup control node 404, 406 may determine that the primary control node 402 has failed if the backup control node has not received a heartbeat communication for a certain predetermined period of time. Alternatively, a backup control node 404, 406 may also receive a communication from the primary control node 402 itself (before it failed) or from a worker node 410-420 that the primary control node 402 has failed, for example because the primary control node 402 has failed to communicate with the worker node 410-420.

Different methods may be performed to determine which backup control node of a set of backup control nodes (e.g., backup control nodes 404, 406) can take over for failed primary control node 402 and become the new primary control node. For example, the new primary control node may be chosen based on a ranking or "hierarchy" of backup control nodes based on their unique identifiers. In an alternative example, a backup control node may be assigned to be the new primary control node by another device in the communications grid or from an external device (e.g., a system infrastructure or an end user, such as a server or computer, controlling the communications grid). In another alternative example, the backup control node that takes over as the new primary control node may be designated based on bandwidth or other statistics about the communications grid.

A worker node within the communications grid may also fail. If a worker node fails, work being performed by the failed worker node may be redistributed amongst the operational worker nodes. In an alternative example, the primary control node may transmit a communication to each of the operable worker nodes still on the communications grid that each of the worker nodes should purposefully fail also. After each of the worker nodes fail, they may each retrieve their most recent saved checkpoint of their status and re-start the project from that checkpoint to minimize lost progress on the project being executed. In some examples, a communications grid computing system 400 can be used to generate a visualization of a recurrent neural network.

Figure 5:
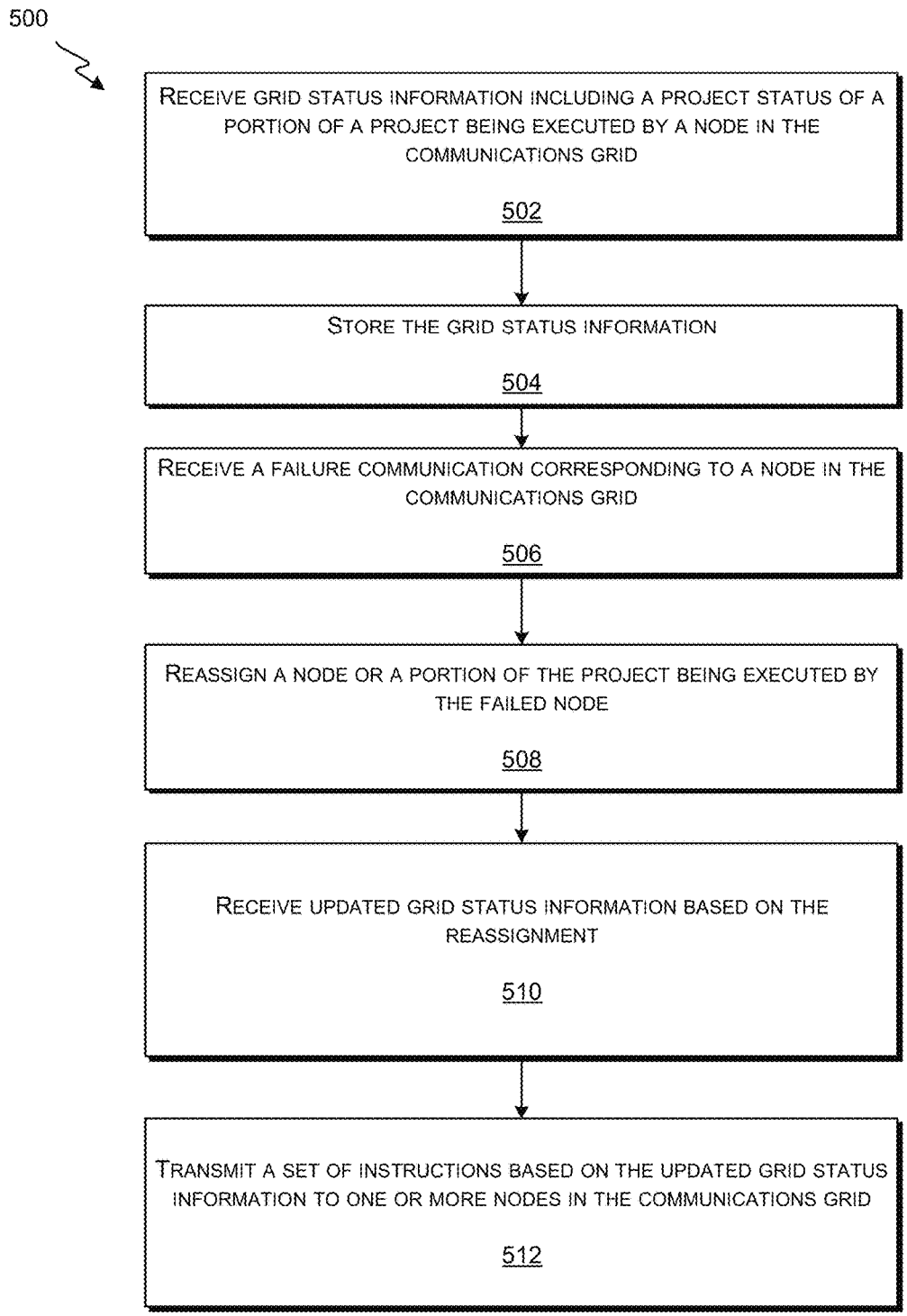
FIG. 5 is a flow chart of an example of a process for adjusting a communications grid or a work project in a communications grid after a failure of a node according to some aspects.

FIG. 5 is a flow chart of an example of a process for adjusting a communications grid or a work project in a communications grid after a failure of a node according to some aspects. The process may include, for example, receiving grid status information including a project status of a portion of a project being executed by a node in the communications grid, as described in operation 502. For example, a control node (e.g., a backup control node connected to a primary control node and a worker node on a communications grid) may receive grid status information, where the grid status information includes a project status of the primary control node or a project status of the worker node. The project status of the primary control node and the project status of the worker node may include a status of one or more portions of a project being executed by the primary and worker nodes in the communications grid. The process may also include storing the grid status information, as described in operation 504. For example, a control node (e.g., a backup control node) may store the received grid status information locally within the control node. Alternatively, the grid status information may be sent to another device for storage where the control node may have access to the information.

The process may also include receiving a failure communication corresponding to a node in the communications grid in operation 506. For example, a node may receive a failure communication including an indication that the primary control node has failed, prompting a backup control node to take over for the primary control node. In an alternative embodiment, a node may receive a failure that a worker node has failed, prompting a control node to reassign the work being performed by the worker node. The process may also include reassigning a node or a portion of the project being executed by the failed node, as described in operation 508. For example, a control node may designate the backup control node as a new primary control node based on the failure communication upon receiving the failure communication. If the failed node is a worker node, a control node may identify a project status of the failed worker node using the snapshot of the communications grid, where the project status of the failed worker node includes a status of a portion of the project being executed by the failed worker node at the failure time.

The process may also include receiving updated grid status information based on the reassignment, as described in operation 510, and transmitting a set of instructions based on the updated grid status information to one or more nodes in the communications grid, as described in operation 512. The updated grid status information may include an updated project status of the primary control node or an updated project status of the worker node. The updated information may be transmitted to the other nodes in the grid to update their stale stored information.

Figure 6:
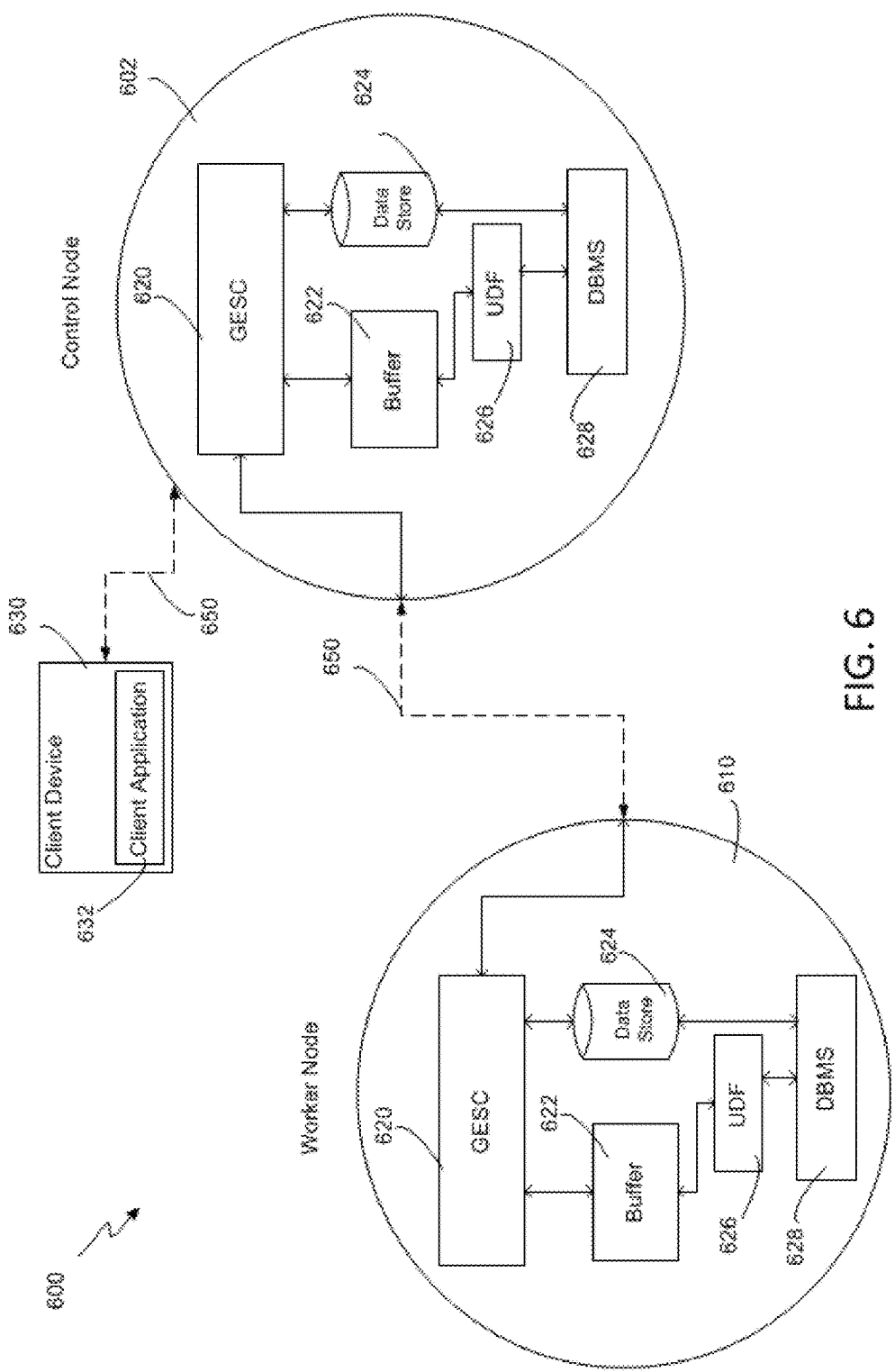
FIG. 6 is a block diagram of a portion of a communications grid computing system including a control node and a worker node according to some aspects.

FIG. 6 is a block diagram of a portion of a communications grid computing system 600 including a control node and a worker node according to some aspects. Communications grid 600 computing system includes one control node (control node 602) and one worker node (worker node 610) for purposes of illustration, but may include more worker and/or control nodes. The control node 602 is communicatively connected to worker node 610 via communication path 650. Therefore, control node 602 may transmit information (e.g., related to the communications grid or notifications), to and receive information from worker node 610 via communication path 650.

Similar to in FIG. 4, communications grid computing system (or just "communications grid") 600 includes data processing nodes (control node 602 and worker node 610). Nodes 602 and 610 comprise multi-core data processors. Each node 602 and 610 includes a grid-enabled software component (GESC) 620 that executes on the data processor associated with that node and interfaces with buffer memory 622 also associated with that node. Each node 602 and 610 includes database management software (DBMS) 628 that executes on a database server (not shown) at control node 602 and on a database server (not shown) at worker node 610.

Each node also includes a data store 624. Data stores 624, similar to network-attached data stores 110 in FIG. 1 and data stores 235 in FIG. 2, are used to store data to be processed by the nodes in the computing environment. Data stores 624 may also store any intermediate or final data generated by the computing system after being processed, for example in non-volatile memory. However in certain examples, the configuration of the grid computing environment allows its operations to be performed such that intermediate and final data results can be stored solely in volatile memory (e.g., RAM), without a requirement that intermediate or final data results be stored to non-volatile types of memory. Storing such data in volatile memory may be useful in certain situations, such as when the grid receives queries (e.g., ad hoc) from a client and when responses, which are generated by processing large amounts of data, need to be generated quickly or on-the-fly. In such a situation, the grid may be configured to retain the data within memory so that responses can be generated at different levels of detail and so that a client may interactively query against this information.

Each node also includes a user-defined function (UDF) 626. The UDF provides a mechanism for the DMBS 628 to transfer data to or receive data from the database stored in the data stores 624 that are managed by the DBMS. For example, UDF 626 can be invoked by the DBMS to provide data to the GESC for processing. The UDF 626 may establish a socket connection (not shown) with the GESC to transfer the data. Alternatively, the UDF 626 can transfer data to the GESC by writing data to shared memory accessible by both the UDF and the GESC.

The GESC 620 at the nodes 602 and 610 may be connected via a network, such as network 108 shown in FIG. 1. Therefore, nodes 602 and 610 can communicate with each other via the network using a predetermined communication protocol such as, for example, the Message Passing Interface (MPI). Each GESC 620 can engage in point-to-point communication with the GESC at another node or in collective communication with multiple GESCs via the network. The GESC 620 at each node may contain identical (or nearly identical) software instructions. Each node may be capable of operating as either a control node or a worker node. The GESC at the control node 602 can communicate, over a communication path 652, with a client device 630. More specifically, control node 602 may communicate with client application 632 hosted by the client device 630 to receive queries and to respond to those queries after processing large amounts of data.

DMBS 628 may control the creation, maintenance, and use of database or data structure (not shown) within nodes 602 or 610. The database may organize data stored in data stores 624. The DMBS 628 at control node 602 may accept requests for data and transfer the appropriate data for the request. With such a process, collections of data may be distributed across multiple physical locations. In this example, each node 602 and 610 stores a portion of the total data managed by the management system in its associated data store 624.

Furthermore, the DBMS may be responsible for protecting against data loss using replication techniques. Replication includes providing a backup copy of data stored on one node on one or more other nodes. Therefore, if one node fails, the data from the failed node can be recovered from a replicated copy residing at another node. However, as described herein with respect to FIG. 4, data or status information for each node in the communications grid may also be shared with each node on the grid.

Figure 7:
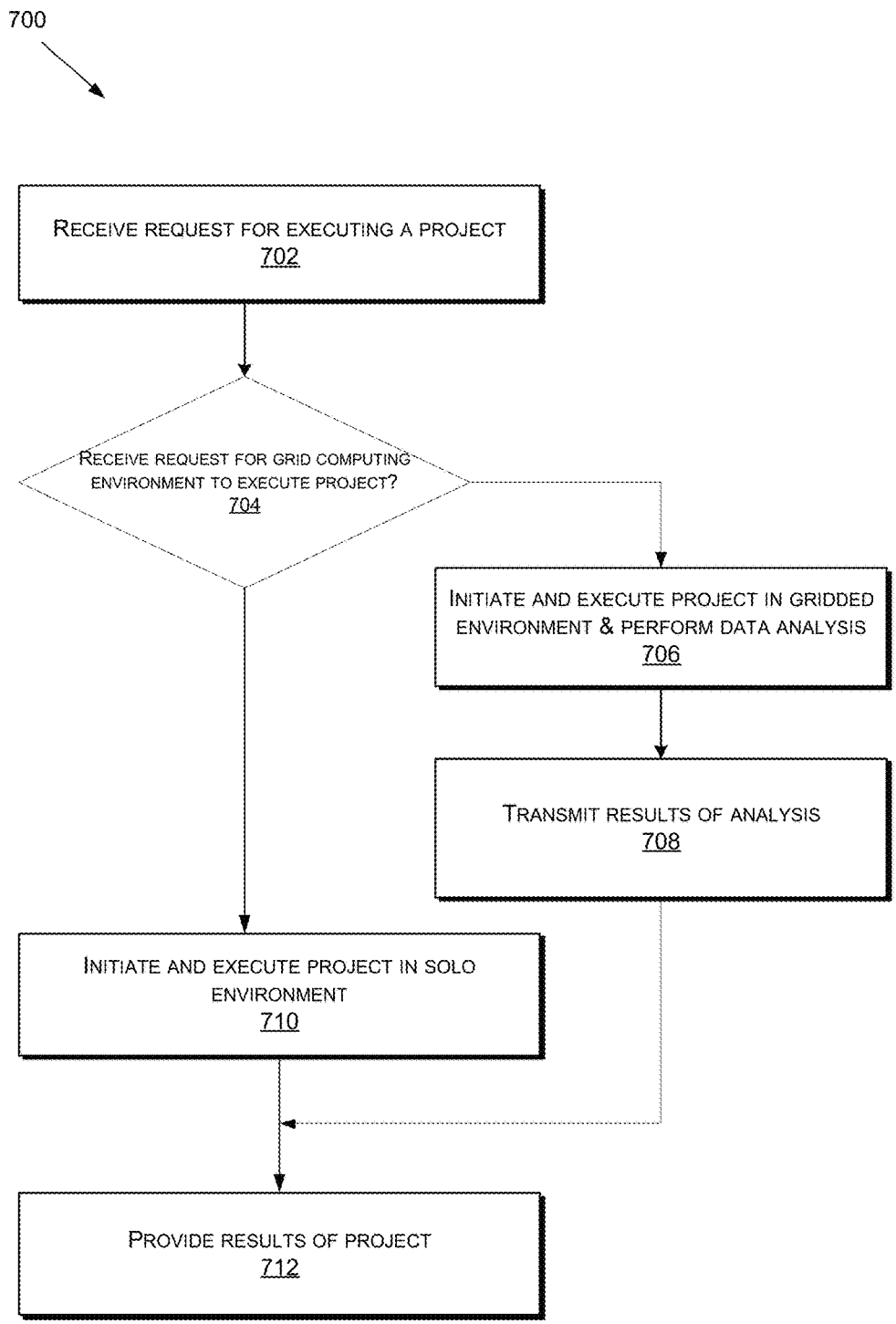
FIG. 7 is a flow chart of an example of a process for executing a data analysis or processing project according to some aspects.

FIG. 7 is a flow chart of an example of a process for executing a data analysis or a processing project according to some aspects. As described with respect to FIG. 6, the GESC at the control node may transmit data with a client device (e.g., client device 630) to receive queries for executing a project and to respond to those queries after large amounts of data have been processed. The query may be transmitted to the control node, where the query may include a request for executing a project, as described in operation 702. The query can contain instructions on the type of data analysis to be performed in the project and whether the project should be executed using the grid-based computing environment, as shown in operation 704.

To initiate the project, the control node may determine if the query requests use of the grid-based computing environment to execute the project. If the determination is no, then the control node initiates execution of the project in a solo environment (e.g., at the control node), as described in operation 710. If the determination is yes, the control node may initiate execution of the project in the grid-based computing environment, as described in operation 706. In such a situation, the request may include a requested configuration of the grid. For example, the request may include a number of control nodes and a number of worker nodes to be used in the grid when executing the project. After the project has been completed, the control node may transmit results of the analysis yielded by the grid, as described in operation 708. Whether the project is executed in a solo or grid-based environment, the control node provides the results of the project.

As noted with respect to FIG. 2, the computing environments described herein may collect data (e.g., as received from network devices, such as sensors, such as network devices 204-209 in FIG. 2, and client devices or other sources) to be processed as part of a data analytics project, and data may be received in real time as part of a streaming analytics environment (e.g., ESP). Data may be collected using a variety of sources as communicated via different kinds of networks or locally, such as on a real-time streaming basis. For example, network devices may receive data periodically from network device sensors as the sensors continuously sense, monitor and track changes in their environments. More specifically, an increasing number of distributed applications develop or produce continuously flowing data from distributed sources by applying queries to the data before distributing the data to geographically distributed recipients. An event stream processing engine (ESPE) may continuously apply the queries to the data as it is received and determines which entities should receive the data. Client or other devices may also subscribe to the ESPE or other devices processing ESP data so that they can receive data after processing, based on for example the entities determined by the processing engine. For example, client devices 230 in FIG. 2 may subscribe to the ESPE in computing environment 214. In another example, event subscription devices 1024a-c, described further with respect to FIG. 10, may also subscribe to the ESPE. The ESPE may determine or define how input data or event streams from network devices or other publishers (e.g., network devices 204-209 in FIG. 2) are transformed into meaningful output data to be consumed by subscribers, such as for example client devices 230 in FIG. 2.

Figure 8:
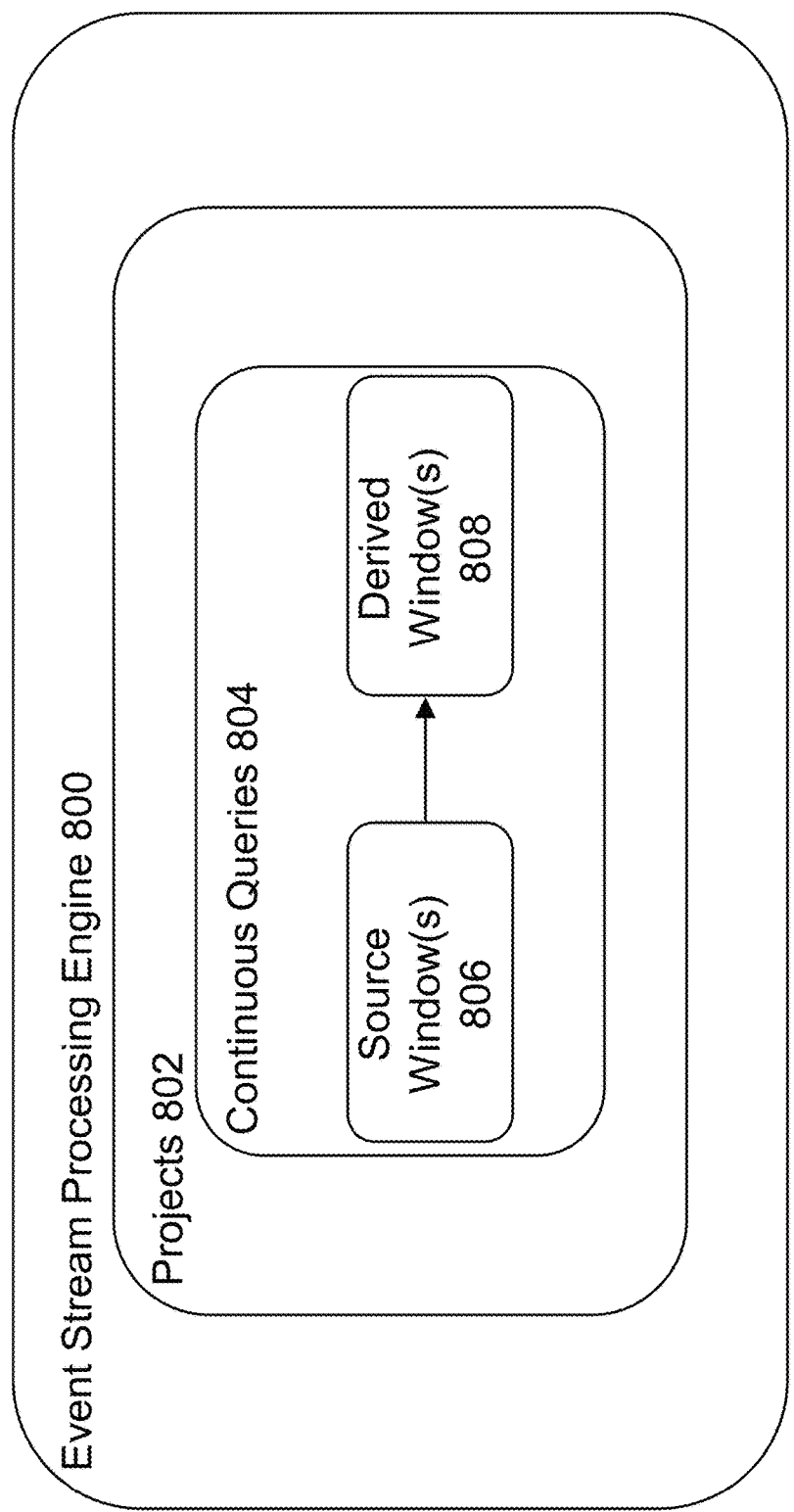
FIG. 8 is a block diagram including components of an Event Stream Processing Engine (ESPE) according to some aspects.

FIG. 8 is a block diagram including components of an Event Stream Processing Engine (ESPE) according to some aspects. ESPE 800 may include one or more projects 802. A project may be described as a second-level container in an engine model managed by ESPE 800 where a thread pool size for the project may be defined by a user. Each project of the one or more projects 802 may include one or more continuous queries 804 that contain data flows, which are data transformations of incoming event streams. The one or more continuous queries 804 may include one or more source windows 806 and one or more derived windows 808.

The ESPE may receive streaming data over a period of time related to certain events, such as events or other data sensed by one or more network devices. The ESPE may perform operations associated with processing data created by the one or more devices. For example, the ESPE may receive data from the one or more network devices 204-209 shown in FIG. 2. As noted, the network devices may include sensors that sense different aspects of their environments, and may collect data over time based on those sensed observations. For example, the ESPE may be implemented within one or more of machines 220 and 240 shown in FIG.

2. The ESPE may be implemented within such a machine by an ESP application. An ESP application may embed an ESPE with its own dedicated thread pool or pools into its application space where the main application thread can do application-specific work and the ESPE processes event streams at least by creating an instance of a model into processing objects.

The engine container is the top-level container in a model that manages the resources of the one or more projects 802. In an illustrative example, there may be only one ESPE 800 for each instance of the ESP application, and ESPE 800 may have a unique engine name. Additionally, the one or more projects 802 may each have unique project names, and each query may have a unique continuous query name and begin with a uniquely named source window of the one or more source windows 806. ESPE 800 may or may not be persistent.

Continuous query modeling involves defining directed graphs of windows for event stream manipulation and transformation. A window in the context of event stream manipulation and transformation is a processing node in an event stream processing model. A window in a continuous query can perform aggregations, computations, pattern-matching, and other operations on data flowing through the window. A continuous query may be described as a directed graph of source, relational, pattern matching, and procedural windows. The one or more source windows 806 and the one or more derived windows 808 represent continuously executing queries that generate updates to a query result set as new event blocks stream through ESPE 800. A directed graph, for example, is a set of nodes connected by edges, where the edges have a direction associated with them.

An event object may be described as a packet of data accessible as a collection of fields, with at least one of the fields defined as a key or unique identifier (ID). The event object may be created using a variety of formats including binary, alphanumeric, XML, etc. Each event object may include one or more fields designated as a primary identifier (ID) for the event so ESPE 800 can support operation codes (opcodes) for events including insert, update, upsert, and delete. Upsert opcodes update the event if the key field already exists; otherwise, the event is inserted. For illustration, an event object may be a packed binary representation of a set of field values and include both metadata and field data associated with an event. The metadata may include an opcode indicating if the event represents an insert, update, delete, or upsert, a set of flags indicating if the event is a normal, partial-update, or a retention generated event from retention policy management, and a set of microsecond timestamps that can be used for latency measurements.

An event block object may be described as a grouping or package of event objects. An event stream may be described as a flow of event block objects. A continuous query of the one or more continuous queries 804 transforms a source event stream made up of streaming event block objects published into ESPE 800 into one or more output event streams using the one or more source windows 806 and the one or more derived windows 808. A continuous query can also be thought of as data flow modeling.

The one or more source windows 806 are at the top of the directed graph and have no windows feeding into them. Event streams are published into the one or more source windows 806, and from there, the event streams may be directed to the next set of connected windows as defined by the directed graph. The one or more derived windows 808 are all instantiated windows that are not source windows and that have other windows streaming events into them. The one or more derived windows 808 may perform computations or transformations on the incoming event streams. The one or more derived windows 808 transform event streams based on the window type (that is operators such as join, filter, compute, aggregate, copy, pattern match, procedural, union, etc.) and window settings. As event streams are published into ESPE 800, they are continuously queried, and the resulting sets of derived windows in these queries are continuously updated.

Figure 9:
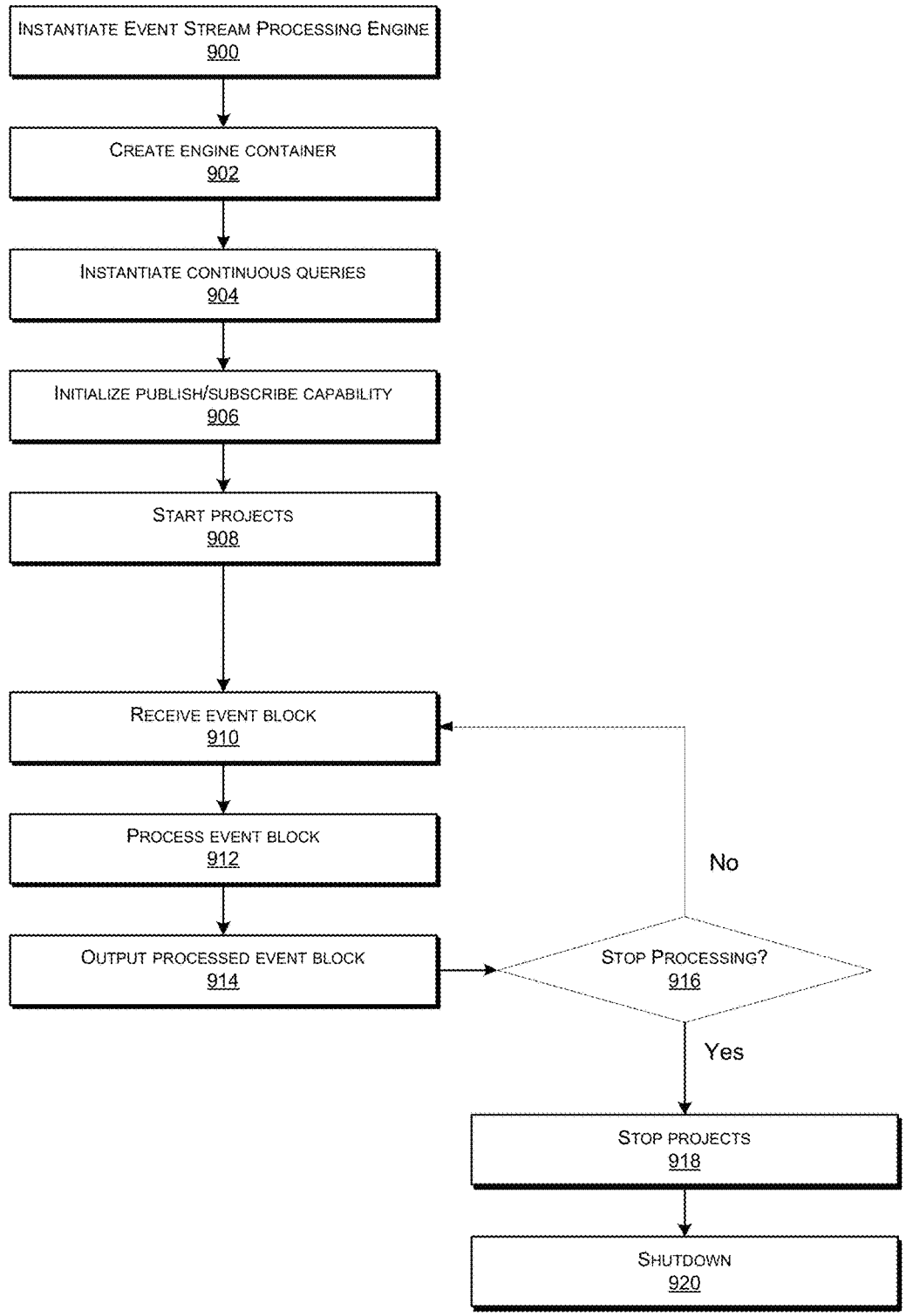
FIG. 9 is a flow chart of an example of a process including operations performed by an event stream processing engine according to some aspects.

FIG. 9 is a flow chart of an example of a process including operations performed by an event stream processing engine according to some aspects. As noted, the ESPE 800 (or an associated ESP application) defines how input event streams are transformed into meaningful output event streams. More specifically, the ESP application may define how input event streams from publishers (e.g., network devices providing sensed data) are transformed into meaningful output event streams consumed by subscribers (e.g., a data analytics project being executed by a machine or set of machines).

Within the application, a user may interact with one or more user interface windows presented to the user in a display under control of the ESPE independently or through a browser application in an order selectable by the user. For example, a user may execute an ESP application, which causes presentation of a first user interface window, which may include a plurality of menus and selectors such as drop down menus, buttons, text boxes, hyperlinks, etc. associated with the ESP application as understood by a person of skill in the art. Various operations may be performed in parallel, for example, using a plurality of threads.

At operation 900, an ESP application may define and start an ESPE, thereby instantiating an ESPE at a device, such as machine 220 and/or 240. In an operation 902, the engine container is created. For illustration, ESPE 800 may be instantiated using a function call that specifies the engine container as a manager for the model.

In an operation 904, the one or more continuous queries 804 are instantiated by ESPE 800 as a model. The one or more continuous queries 804 may be instantiated with a dedicated thread pool or pools that generate updates as new events stream through ESPE 800. For illustration, the one or more continuous queries 804 may be created to model business processing logic within ESPE 800, to predict events within ESPE 800, to model a physical system within ESPE 800, to predict the physical system state within ESPE 800, etc. For example, as noted, ESPE 800 may be used to support sensor data monitoring and management (e.g., sensing may include force, torque, load, strain, position, temperature, air pressure, fluid flow, chemical properties, resistance, electromagnetic fields, radiation, irradiance, proximity, acoustics, moisture, distance, speed, vibrations, acceleration, electrical potential, or electrical current, etc.).

ESPE 800 may analyze and process events in motion or "event streams." Instead of storing data and running queries against the stored data, ESPE 800 may store queries and stream data through them to allow continuous analysis of data as it is received. The one or more source windows 806 and the one or more derived windows 808 may be created based on the relational, pattern matching, and procedural algorithms that transform the input event streams into the output event streams to model, simulate, score, test, predict, etc. based on the continuous query model defined and application to the streamed data.

In an operation 906, a publish/subscribe (pub/sub) capability is initialized for ESPE 800. In an illustrative embodiment, a pub/sub capability is initialized for each project of the one or more projects 802. To initialize and enable pub/sub capability for ESPE 800, a port number may be provided. Pub/sub clients can use a host name of an ESP device running the ESPE and the port number to establish pub/sub connections to ESPE 800.

Figure 10:
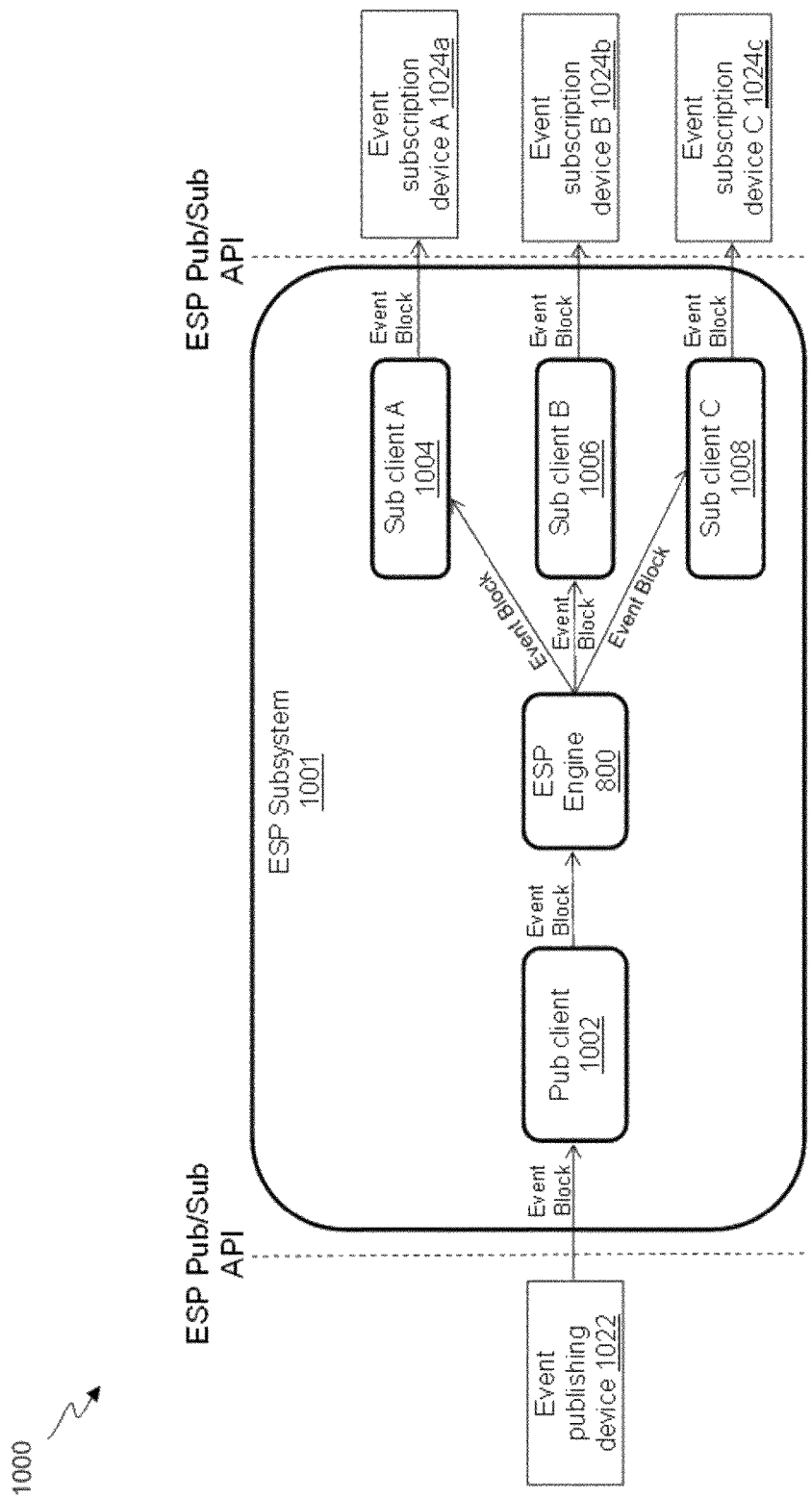
FIG. 10 is a block diagram of an ESP system interfacing between a publishing device and multiple event subscribing devices according to some aspects.

FIG. 10 is a block diagram of an ESP system 1000 interfacing between publishing device 1022 and event subscription devices 1024*a*-*c* according to some aspects. ESP system 1000 may include ESP subsystem 1001, publishing device 1022, an event subscription device A 1024*a*, an event subscription device B 1024*b*, and an event subscription device C 1024*c*. Input event streams are output to ESP subsystem 1001 by publishing device 1022. In alternative embodiments, the input event streams may be created by a plurality of publishing devices. The plurality of publishing devices further may publish event streams to other ESP devices. The one or more continuous queries instantiated by ESPE 800 may analyze and process the input event streams to form output event streams output to event subscription device A 1024*a*, event subscription device B 1024*b*, and event subscription device C 1024*c*. ESP system 1000 may include a greater or a fewer number of event subscription devices of event subscription devices.

Publish-subscribe is a message-oriented interaction paradigm based on indirect addressing. Processed data recipients specify their interest in receiving information from ESPE 800 by subscribing to specific classes of events, while information sources publish events to ESPE 800 without directly addressing the receiving parties. ESPE 800 coordinates the interactions and processes the data. In some cases, the data source receives confirmation that the published information has been received by a data recipient.

A publish/subscribe API may be described as a library that enables an event publisher, such as publishing device 1022, to publish event streams into ESPE 800 or an event subscriber, such as event subscription device A 1024*a*, event subscription device B 1024*b*, and event subscription device C 1024*c*, to subscribe to event streams from ESPE 800. For illustration, one or more publish/subscribe APIs may be defined. Using the publish/subscribe API, an event publishing application may publish event streams into a running event stream processor project source window of ESPE 800, and the event subscription application may subscribe to an event stream processor project source window of ESPE 800.

The publish/subscribe API provides cross-platform connectivity and endianness compatibility between ESP application and other networked applications, such as event publishing applications instantiated at publishing device 1022, and event subscription applications instantiated at one or more of event subscription device A 1024*a*, event subscription device B 1024*b*, and event subscription device C 1024*c*.

Referring back to FIG. 9, operation 906 initializes the publish/subscribe capability of ESPE 800. In an operation 908, the one or more projects 802 are started. The one or more started projects may run in the background on an ESP device. In an operation 910, an event block object is received from one or more computing device of the publishing device 1022.

ESP subsystem 1001 may include a publishing client 1002, ESPE 800, a subscribing client A 1004, a subscribing client B 1006, and a subscribing client C 1008. Publishing client 1002 may be started by an event publishing application executing at publishing device 1022 using the publish/subscribe API. Subscribing client A 1004 may be started by an event subscription application A, executing at event subscription device A 1024*a* using the publish/subscribe API. Subscribing client B 1006 may be started by an event subscription application B executing at event subscription device B 1024*b* using the publish/subscribe API. Subscribing client C 1008 may be started by an event subscription application C executing at event subscription device C 1024*c* using the publish/subscribe API.

An event block object containing one or more event objects is injected into a source window of the one or more source windows 806 from an instance of an event publishing application on publishing device 1022. The event block object may be generated, for example, by the event publishing application and may be received by publishing client 1002. A unique ID may be maintained as the event block object is passed between the one or more source windows 806 and/or the one or more derived windows 808 of ESPE 800, and to subscribing client A 1004, subscribing client B 1006, and subscribing client C 1008 and to event subscription device A 1024*a*, event subscription device B 1024*b*, and event subscription device C 1024*c*. Publishing client 1002 may further generate and include a unique embedded transaction ID in the event block object as the event block object is processed by a continuous query, as well as the unique ID that publishing device 1022 assigned to the event block object.

In an operation 912, the event block object is processed through the one or more continuous queries 804. In an operation 914, the processed event block object is output to one or more computing devices of the event subscription devices 1024*a*-*c*. For example, subscribing client A 1004, subscribing client B 1006, and subscribing client C 1008 may send the received event block object to event subscription device A 1024*a*, event subscription device B 1024*b*, and event subscription device C 1024*c*, respectively.

ESPE 800 maintains the event block containership aspect of the received event blocks from when the event block is published into a source window and works its way through the directed graph defined by the one or more continuous queries 804 with the various event translations before being output to subscribers. Subscribers can correlate a group of subscribed events back to a group of published events by comparing the unique ID of the event block object that a publisher, such as publishing device 1022, attached to the event block object with the event block ID received by the subscriber.

In an operation 916, a determination is made concerning whether or not processing is stopped. If processing is not stopped, processing continues in operation 910 to continue receiving the one or more event streams containing event block objects from the, for example, one or more network devices. If processing is stopped, processing continues in an operation 918. In operation 918, the started projects are stopped. In operation 920, the ESPE is shutdown.

As noted, in some examples, big data is processed for an analytics project after the data is received and stored. In other examples, distributed applications process continuously flowing data in real-time from distributed sources by applying queries to the data before distributing the data to geographically distributed recipients. As noted, an event stream processing engine (ESPE) may continuously apply the queries to the data as it is received and determines which entities receive the processed data. This allows for large amounts of data being received and/or collected in a variety of environments to be processed and distributed in real time. For example, as shown with respect to FIG. 2, data may be collected from network devices that may include devices within the internet of things, such as devices within a home automation network. However, such data may be collected from a variety of different resources in a variety of different environments. In any such situation, embodiments of the present technology allow for real-time processing of such data.

Aspects of the present disclosure provide technical solutions to technical problems, such as computing problems that arise when an ESP device fails which results in a complete service interruption and potentially significant data loss. The data loss can be catastrophic when the streamed data is supporting mission critical operations, such as those in support of an ongoing manufacturing or drilling operation. An example of an ESP system achieves a rapid and seamless failover of ESPE running at the plurality of ESP devices without service interruption or data loss, thus significantly improving the reliability of an operational system that relies on the live or real-time processing of the data streams. The event publishing systems, the event subscribing systems, and each ESPE not executing at a failed ESP device are not aware of or effected by the failed ESP device. The ESP system may include thousands of event publishing systems and event subscribing systems. The ESP system keeps the failover logic and awareness within the boundaries of out-messaging network connector and out-messaging network device.

In one example embodiment, a system is provided to support a failover when event stream processing (ESP) event blocks. The system includes, but is not limited to, an out-messaging network device and a computing device. The computing device includes, but is not limited to, one or more processors and one or more computer-readable mediums operably coupled to the one or more processor. The processor is configured to execute an ESP engine (ESPE). The computer-readable medium has instructions stored thereon that, when executed by the processor, cause the computing device to support the failover. An event block object is received from the ESPE that includes a unique identifier. A first status of the computing device as active or standby is determined. When the first status is active, a second status of the computing device as newly active or not newly active is determined. Newly active is determined when the computing device is switched from a standby status to an active status. When the second status is newly active, a last published event block object identifier that uniquely identifies a last published event block object is determined. A next event block object is selected from a non-transitory computer-readable medium accessible by the computing device. The next event block object has an event block object identifier that is greater than the determined last published event block object identifier. The selected next event block object is published to an out-messaging network device. When the second status of the computing device is not newly active, the received event block object is published to the out-messaging network device. When the first status of the computing device is standby, the received event block object is stored in the non-transitory computer-readable medium.

Figure 11:
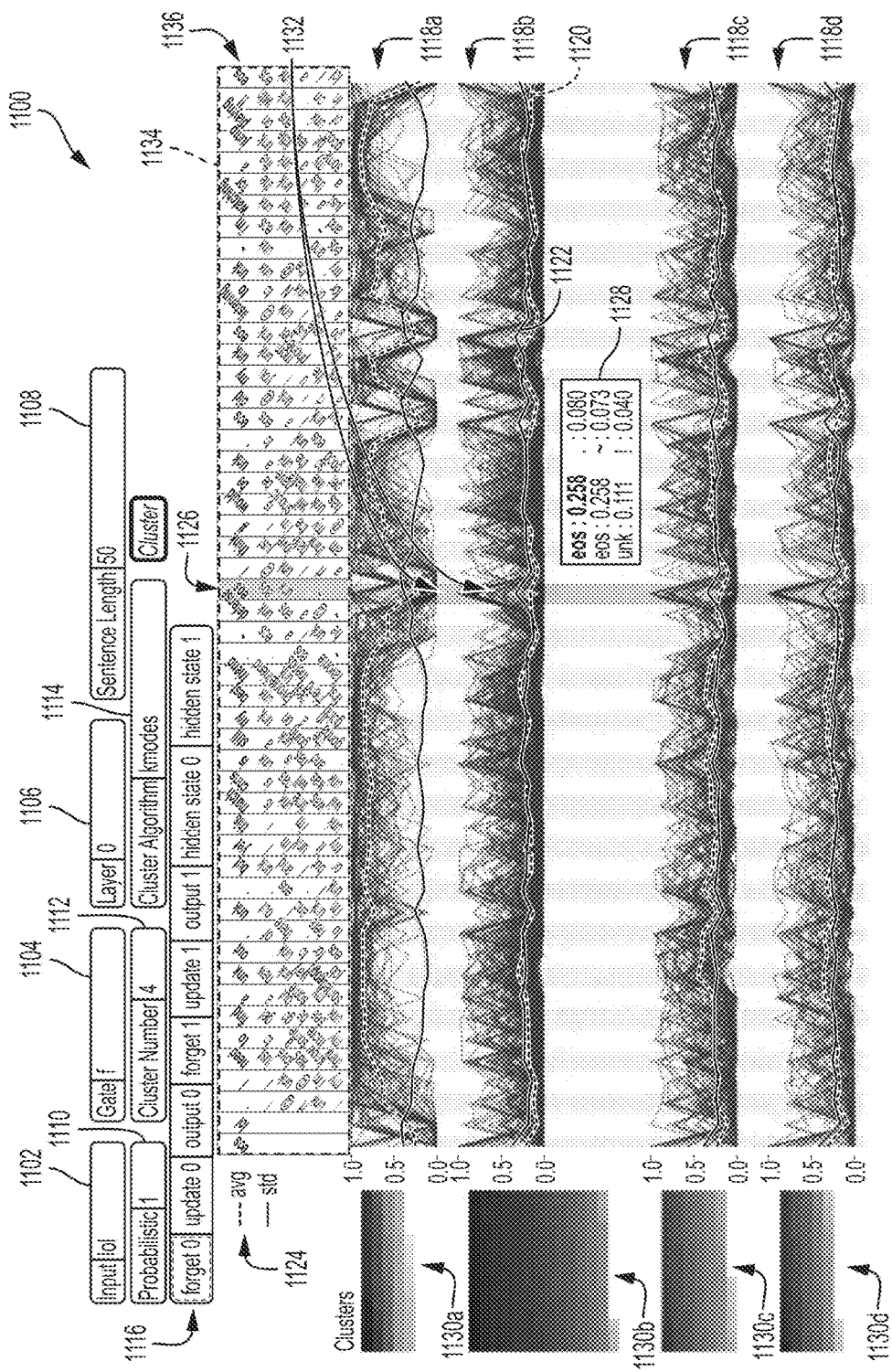
FIG. 11 is an example of a graphical user interface (GUI) for visualizing a recurrent neural network according to some aspects.

FIG. 11 is an example of a graphical user interface (GUI) 1100 for visualizing a recurrent neural network according to some aspects. In this example, the recurrent neural network can receive an input word and produce one or more sentences (e.g., tweets) as output. But other examples can involve other types of recurrent neural networks. The GUI 1100 is produced by an underlying GUI system with one or more processing devices.

The GUI 1100 can include various input components for receiving user inputs. For example, the GUI 1110 can include an input component 1102 to enable a user to select the input word, which in this example is "lol." The GUI 1100 can include another input component 1108 to enable the user to select the output length, which in this example is a maximum of 50 words. The GUI 1100 can also include other input components that enable the user to specify features of the recurrent neural network to visualize. One such example is input component 1104, which can enable a user to select a gate to visualize in the GUI 1100. In FIG. 11, the input component 1104 has the input "f," indicating that a forget gate of a long short-term memory (LSTM) network is to be visualized. But the user could alternatively input, for example, the value "u" or "o" to select an input gate or an output gate, respectively, of the LSTM network. In some examples, the GUI system can analyze the recurrent neural network to dynamically populate a dropdown menu (or other list) of gates in the recurrent neural network, from which the user can select a particular gate to visualize via input component 1104. After selecting a gate to visualize, the user can use input component 1106 to select a layer number within that gate to visualize. In FIG. 11, the input component 1106 has the input "0," which indicates that layer 0 of the gate (e.g., gate "f") is to be visualized. But the user could alternatively input, for example, the value "1" or "2" to select layer 1 or layer 2, respectively, of the forget gate. In some examples, the GUI system can analyze the selected gate to dynamically populate a dropdown menu (or other list) of layers in the gate, from which the user can select a particular layer to visualize via input component 1106. The GUI 1100 can further include additional input components 1110, 1112, and 1114 for specifying how clustering is to be performed to generate the cluster maps 1130a-d of the GUI 1100, as discussed in greater detail below.

Once the appropriate inputs have been provided to the GUI 1100, a user can interact with (e.g., press a button in) the GUI 1100 to cause the recurrent neural network to be executed in accordance with the user inputs. For example, the GUI system can detect the button press and responsively execute the recurrent neural network in accordance with the user inputs. This may involve, for example, the GUI system providing the input word specified via input component 1102 as input to the recurrent neural network and executing the recurrent neural network until the output length specified via input component 1108 is reached.

The recurrent neural network can include memory cells with one or more gates. In the example shown in FIG. 11, the recurrent neural network has a memory cell that has a forget gate, an update gate, an output gate, and a hidden state, which are designated in FIG. 11 as "forget 0," "update 0"," "output 0", and "hidden state 0," respectively. The recurrent neural network also has another memory cell that has a forget gate, an update gate, an output gate, and a hidden state, which are designated in FIG. 11 as "forget 1," "update 1"," "output 1", and "hidden state 1," respectively. Each of the gates is formed from one or more nodes of the recurrent neural network. For example, the "forget 0" gate can include 120 nodes in a hidden layer of the recurrent neural network. As the recurrent neural network executes over a sequence of time steps, it will generate a value for each node in each gate at each time step. For example, the 120 nodes in the "forget 0" gate may have 120 values at time t−1, another 120 values at time t, and yet another 120 values at time t+1. The GUI system can store each of these sets of values in a separate vector. For example, the GUI system can store the 120 values at time t−1 in one vector, the 120 values at time t in another vector, and the 120 values at time t+1 in yet another vector, thereby grouping all of the node values for a particular gate at a particular time-step in a particular vector. The GUI system can iterate this process to produce vectors that have some or all of the node values for some or all of the gates at some or all of the time steps.

After generating the above-mentioned vectors, the GUI system can output graphical elements in the GUI 1100 visually depicting information derived from the vectors. For example, the GUI 1100 includes a menu 1116 from which the user can select which gate of the recurrent neural network to visualize. In FIG. 11, the user has selected gate "forget 0" for visualization. So, the GUI system can detect this selection and responsively output one or more graphical elements depicting information related to the "forget 0" gate, whereby at least some of this information is derived from the vectors.

For example, the GUI system can apply a clustering method to the vectors in order to group all of the nodes in the selected gate (e.g., the "forget 0" gate) into clusters having similar node-value patterns over the sequence of time steps. How the clustering method is applied to the vectors can be customized by a user. For example, the user can turn on or off a probabilistic setting via input component 1110. In the example shown in FIG. 11, the input component 1110 can accept a Boolean value to turn on or off the probabilistic setting, where a value of "1" turns on the probabilistic setting and a value of "0" turns off the probabilistic setting (e.g., such that a default, deterministic setting is turned on). The user can also specify a total number of clusters via input component 1112. The user can further specify a clustering method via input component 1114. Examples of the clustering method can include a K-modes or a K-means clustering method. The GUI system can receive these user inputs and group the nodes in the selected gate into the clusters in accordance with the user inputs. Next, the GUI system can determine a reference value (e.g., an average or centroid) for a cluster by combining multiple node-values in the cluster. For example, the GUI system can average the node values in a cluster to determine a reference value for that cluster. The GUI system may iterate this process to determine a respective reference-value for each of the clusters. Finally, the GUI system can produce some or all of the cluster maps 1130*a-d*. Each of the cluster maps 1130*a-d* can represent a single cluster and include a group of cells. Each cell can represent a single node in the cluster and may be color coded to indicate a difference between the node's value and the reference value for the cluster. For example, a cell can have a darker color if there is a smaller difference between the node's value and the reference value, or a lighter color if there is a larger difference between the node's value and the reference value. Or vice-versa. Any color coding scheme can be used.

The GUI system can additionally or alternatively generate some or all of the graphs 1118*a-d* in the GUI 1100. Each of the graphs 1118*a-d* can correspond to one of the cluster maps 1130*a-d*. For example, graph 1118*a* can correspond to cluster map 1130*a*, graph 1118*b* can correspond to cluster map 1130*b*, graph 1118*c* can correspond to cluster map 1130*c*, and graph 1118*d* can correspond to cluster map 1130*d*. The graphs 1118*a-d* can indicate the sequence of time steps along one axis (e.g., the X-axis) and node values along another axis (e.g., the Y-axis). For example, graph 1118*a* can correspond to cluster map 1130*a*, which in turn corresponds to a particular cluster. The graph 1118*a* can include lines depicting how the value of each node in the particular cluster changed over the sequence of time steps. Some or all of the graphs 1118*a-d* can also include an average line 1120 indicating the average node-value at each time step, a standard-deviation line 1122 indicating a standard deviation among the node values at each time step, or both of these.

In some such examples, the GUI 1100 can include a legend 1124 describing the average line 1120 and the standard-deviation line 1122.

The cluster maps 1130*a-d* and the graphs 118*a-d* can provide valuable insights about the selected gate and the recurrent neural network as a whole. For example, graph 1118*b* is quite similar to graph 1118*d*. This may indicate that one of the clusters of nodes corresponding to graphs 1118*b*, 1118*d* is redundant. So, a designer may eliminate these nodes from the recurrent neural network to improve processing speed and reduce memory consumption of the recurrent neural network. As another example, graphs 1118*a-b* indicate that the corresponding clusters of nodes are impacted by end-of-sentence ("EOS") token inversely to one another. For example, graph 1118*a* shows a dip at point 1132 corresponding to an EOS token, such as a period. Conversely, graph 1118*b* shows a spike at point 1132 corresponding to the same EOS token. And the rest of the graphs 1118*a-b* also indicate a similar inverse correlation at the rest of the time steps. Understanding that these clusters of nodes have an inverse correlation can be very valuable to a designer of the recurrent neural network.

Figure 12:
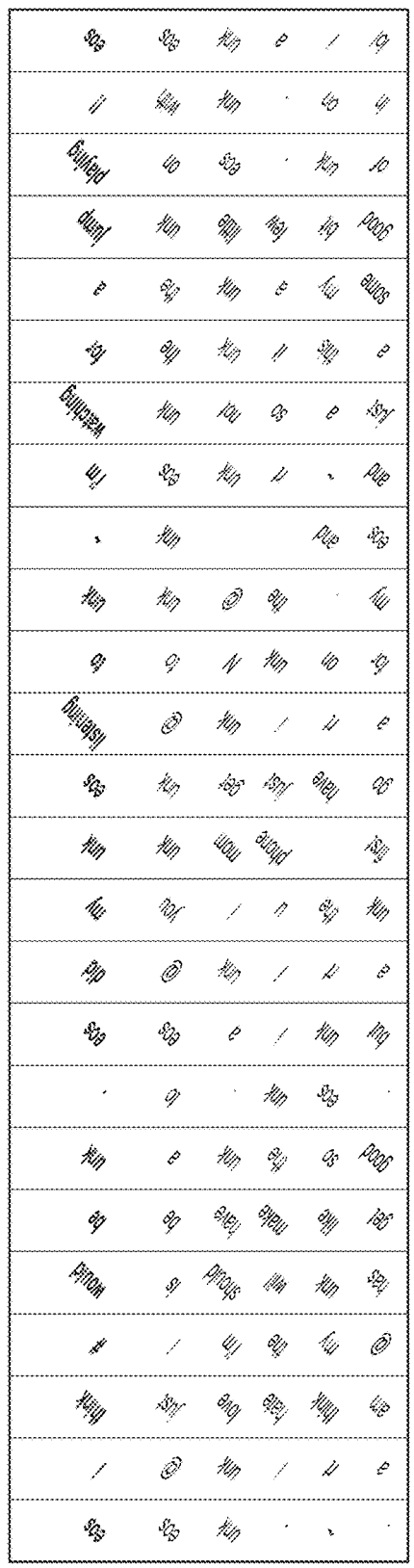
FIG. 12 is an example of a candidate-token list according to some aspects.

In some examples, the GUI system can further generate a candidate-token list 1134. The GUI system can output the candidate-token list 1134 above and adjacent to the graphs 1118*a-d* in the GUI 1100. An enlarged version of a portion of the candidate-token list 1134 is shown in FIG. 12 (only a portion of the candidate-token list 1134 is shown in FIG. 12 for simplicity and clarity). As shown, the candidate-token list can include a list of candidate tokens that the recurrent neural network considered at each time step as potentially being the correct token to output. A token can be a word or character. For example, at each time step, the recurrent neural network can sort through various candidate tokens to determine which of the candidate tokens should be the next token in its output. Specifically, the recurrent neural network can assign each candidate token a likelihood of being the correct token to output at the time step, and choose the candidate token with the highest likelihood as the next token in its output. This process is repeated at each time step to build the final output token-by-token. The GUI system can log the candidate tokens and the finally selected token at each time step. The GUI system can then output this information as the candidate-token list in the GUI. In the example shown in FIGS. 11-12, the candidate-token list is ordered from the finally selected token at the top 1136 to the lowest-likelihood token at the bottom. The finally selected token may also be bolded or shown in another color than the rest of the candidate tokens to visually distinguish the finally selected token from the rest of the candidate tokens. But other orderings and stylization schemes are possible.

Referring back to FIG. 11, in some examples, the GUI 1100 can be interactive. For example, the GUI system can receive user input selecting one or more cells in a cluster map 1130*a* and responsively highlight the lines corresponding to the cells on a corresponding graph 1118*a*. The GUI system may also dim or hide the remaining lines on the graph 1118*a* to make the highlighted lines more visually prominent. This can enable a user to more readily identify lines of interest in the graph 1118*a*. As another example, the GUI system can detect a user selection of a particular time step 1126 and responsively highlight portions of some or all of the graphs 118*a-d* related to that time step. This may make it easier for a user to navigate through the time steps or visually distinguish time steps from one another. The GUI system may additionally or alternatively output a popup window 1128 with additional information related to the particular time step 1126. One example of the additional information can include a list of candidate tokens at the particular time step along with likelihoods of the candidate tokens being correct. For example, in FIG. 11, the popup window 1128 includes the candidate tokens "eos", "eos", "unk" (which can stand for "unknown"), ".", "~", and "!", along with their corresponding likelihoods 0.258, 0.258, 0.111, 0.080, 0.073, and 0.040, respectively. The popup window 1128 can make it easy for the user to obtain additional information of interest related to the particular time step 1126. The GUI 1100 can include other interactive features, too. For example, the GUI system can detect a user selection of (or a user hovering over) a line in a graph 1118a. In response, the GUI system can visually highlight the line on the graph 1118a. The GUI system may also dim or hide the remaining lines on the graph 1118a to make the highlighted line more visually prominent.

While the example shown in FIG. 11 includes cluster maps 1130a-d and graphs 1118a-d, other examples can involve other types of graphical elements that provide similar information (or different information). For instance, other examples can involve bar charts or other types of charts that depict similar information to the graphs 1118a-d. Also, while the graphical elements of FIG. 11 are shown in a particular spatial configuration with respect to one another, other examples can involve other configurations of some or all of the graphical elements. Any combination, configuration, and type(s) of graphical elements can be used to depict some or all of the information represented in the GUI 1100.

Figure 13:
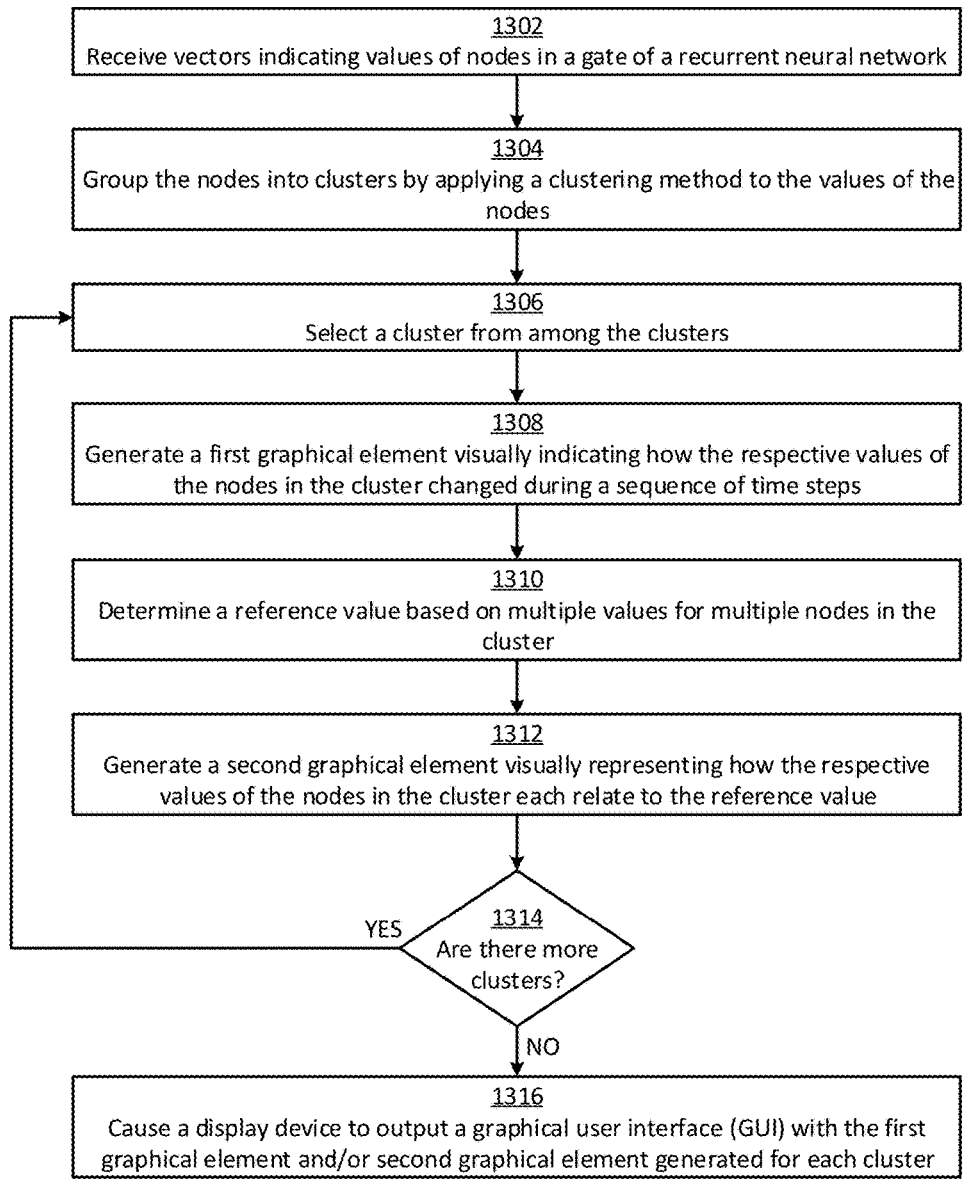
FIG. 13 is a flow chart of an example of a process for generating a visualization according to some aspects.

FIG. 13 is a flow chart of an example of a process for generating a visualization according to some aspects. Some examples can include more steps than, fewer steps than, different steps than, or a different order of the steps shown in FIG. 13. Some examples can be implemented using any of the systems and processes described with respect to FIGS. 1-10.

In block 1302, a processing device receives vectors indicating values of nodes in a gate of a recurrent neural network. The values can be the result of data being processed at the gate over the sequence of time steps. Each vector can include values for some or all of the nodes in the gate at a particular time step in the sequence.

In some examples, the processing device can obtain the vectors by executing the recurrent neural network. Alternatively, the processing device can cause the recurrent neural network to be executed on a remote computing device, from which the recessing device can receive the vectors. The recurrent neural network can be executed in accordance with one or more user inputs provided via input components 1102-1108 of FIG. 11.

In block 1304, the processing device groups the nodes into clusters by applying a clustering method (e.g., K-means clustering) to the values of the nodes. In some examples, the clustering method involves comparing how the value of each respective node in the gate changed during the sequence of time steps and assigning nodes with like changings to a common cluster. For example, a node's value may have changed in a particular pattern during the sequence of time steps. The processing device can apply the clustering method to determine if another node's value changed in a similar way during the sequence of time steps. If the two nodes' values have a similar enough pattern, the processing device can assign both nodes to the same cluster. Whether two nodes' values have a similar enough pattern to be assigned to the same cluster can depend on the settings/ tolerance of the clustering algorithm. The above process can be repeated to assign some or all of the nodes in the gate to clusters.

In block 1306, the processing device selects a cluster from among the clusters. For example, the processing device can select a first cluster among the group of clusters.

Figure 14:
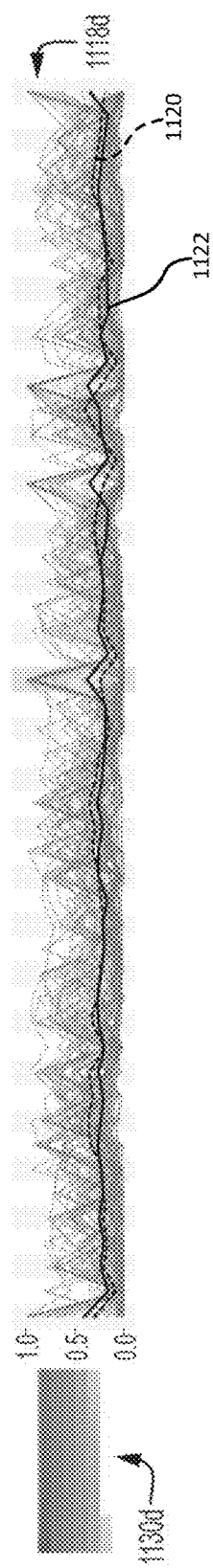
FIG. 14 is an example of a magnified view of a portion of the GUI of FIG. 11 according to some aspects.
Figure 15:
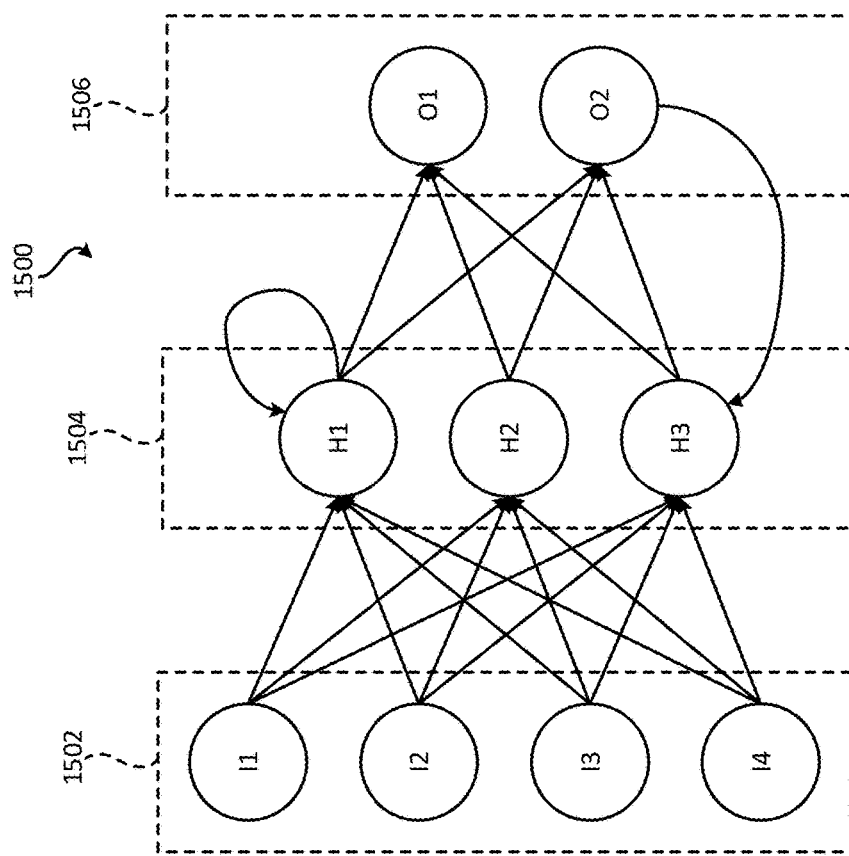
FIG. 15 is an example of a recurrent neural network according to some aspects.
Figure 16:
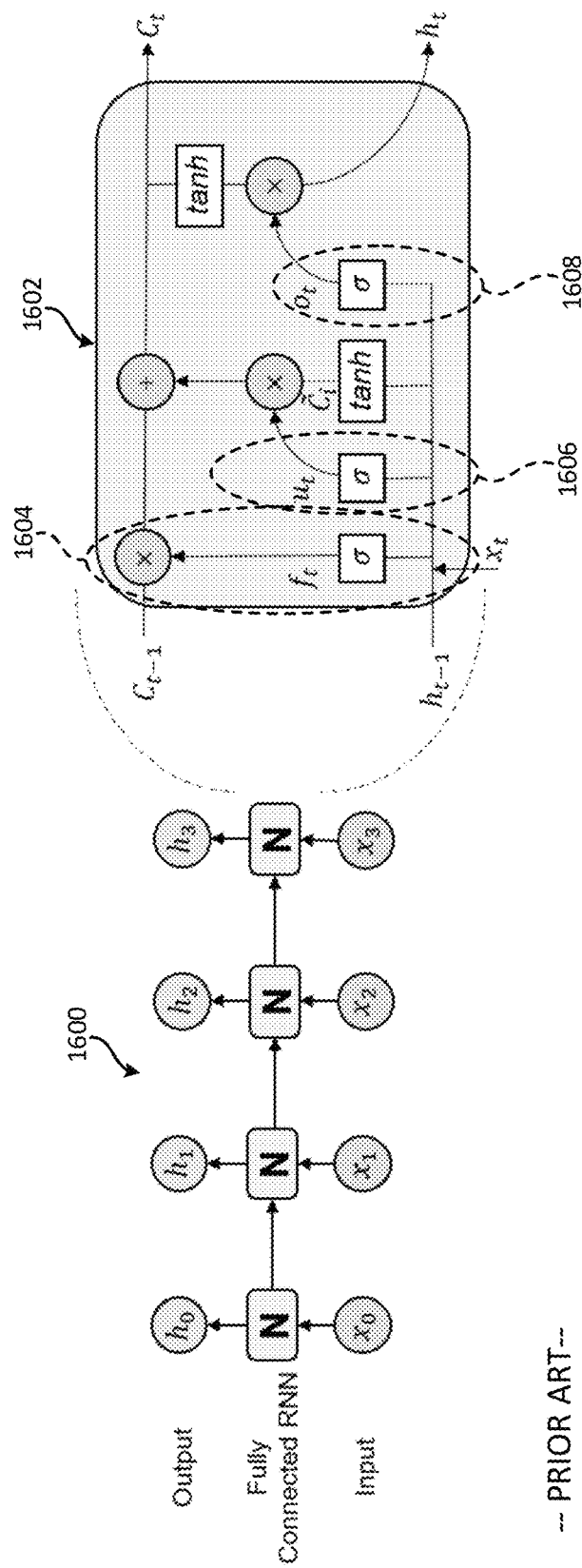
FIG. 16 is an example of a long short-term memory (LSTM) neural network according to some aspects.

In block 1308, the processing device generates a first graphical element visually indicating how the respective values of the nodes in the selected cluster changed during the sequence of time steps. One example of the first graphical element can be the graph 1118d of FIG. 14. The graph 1118d can include lines indicating how the respective values of the nodes in the selected cluster changed during the sequence of time steps. The Y-axis of the graph 1118d can represent the values of the nodes values and the X-axis can represent time. In some examples, the graph 1118d can also include a standard-deviation line 1122, an average line 1120, or both of these. While the first graphical element is a line graph 1118d in FIG. 14, in other examples of the first graphical element can include other types of charts or data tables.

In block 1310, the processing device determines a reference value based on multiple values for multiple nodes in the selected cluster. For example, the processing device can add, multiply, divide, or apply one or more other mathematical operations to multiple values for multiple nodes in the selected cluster to arrive at the reference value. As a particular example, the processing device can average at least the values of at least two nodes in the selected cluster to arrive at the reference value.

In block 1312, the processing device generates a second graphical element visually representing how the respective values of the nodes in the selected cluster each relate to the reference value. One example of the second graphical element can be the cluster map 1130d of FIG. 14. The cluster map 1130d can have a color coding that visually represents how the respective values of the nodes in the selected cluster each relate to the reference value, for example, such that the cluster map 1130d is a type of heat map. Other examples of the second graphical element can include charts or data tables.

In block 1314, the processing device determines if there are more clusters to be visualized. If so, the process can return to block 1306, where another cluster can be selected and operations 1308-1312 can be repeated for that cluster. Otherwise, the process can continue to block 1316.

In block 1316, the processing device can cause a display device to output a graphical user interface (GUI) with the first graphical element and/or the second graphical element that was generated for each cluster. For example, if there are two clusters, the processing device can cause the display device to output the first graphical element 1118d and the second graphical element 1130d for a first cluster. The processing device can also cause the display device to output the first graphical element 1118b and the second graphical element 1130b for a second cluster. The processing device can cause the display device to output graphical content by transmitting a display communication to the display device.

In some examples, the process may lack operations 1304, 1306, and 1314, and may thus not produce clusters. So, the remaining operations (e.g., operations 1308-1312) would be performed with respect to all (or a particular subset) of the nodes in the gate, as opposed to only the nodes in a specific cluster.

The foregoing description of certain examples, including illustrated examples, has been presented only for the purpose of illustration and description and is not intended to be exhaustive or to limit the disclosure to the precise forms disclosed. Numerous modifications, adaptations, and uses thereof will be apparent to those skilled in the art without departing from the scope of the disclosure. And the examples disclosed herein can be combined or rearranged to yield additional examples.

General

In the previous description, for the purposes of explanation, specific details are set forth in order to provide a thorough understanding of examples of the technology. But various examples can be practiced without these specific details. The figures and description are not intended to be restrictive.

The previous description provides examples that are not intended to limit the scope, applicability, or configuration of the disclosure. Rather, the previous description of the examples provides those skilled in the art with an enabling description for implementing an example. Various changes may be made in the function and arrangement of elements without departing from the spirit and scope of the technology as set forth in the appended claims.

Specific details are given in the previous description to provide a thorough understanding of the examples. But the examples may be practiced without these specific details. For example, circuits, systems, networks, processes, and other components can be shown as components in block diagram form to prevent obscuring the examples in unnecessary detail. In other examples, well-known circuits, processes, algorithms, structures, and techniques may be shown without unnecessary detail in order to avoid obscuring the examples.

Also, individual examples may have been described as a process that is depicted as a flowchart, a flow diagram, a data flow diagram, a structure diagram, or a block diagram. Although a flowchart can describe the operations as a sequential process, many of the operations can be performed in parallel or concurrently. In addition, the order of the operations can be re-arranged. And a process can have more or fewer operations than are depicted in a figure. A process can correspond to a method, a function, a procedure, a subroutine, a subprogram, etc. When a process corresponds to a function, its termination can correspond to a return of the function to the calling function or the main function.

Systems depicted in some of the figures can be provided in various configurations. In some examples, the systems can be configured as a distributed system where one or more components of the system are distributed across one or more networks in a cloud computing system.

The invention claimed is:

1. A system comprising:
a processing device; and
a memory device including instructions that are executable by the processing device for causing the processing device to:
receive a plurality of vectors indicating values of a plurality of nodes in a gate of a recurrent neural network resulting from processing data at the gate during a sequence of time steps, each vector among the plurality of vectors including a respective value for each respective node among the plurality of nodes at a respective time step within the sequence of time steps;
group the plurality of nodes into a plurality of clusters by applying a clustering method to the values of the plurality of nodes, the clustering method involving comparing how the respective value for each respective node changed during the sequence of time steps and assigning nodes with like changes during the sequence of time steps to a common cluster among the plurality of clusters;
generate a first graphical element visually indicating how the respective values of the nodes in a cluster among the plurality of clusters changed during the sequence of time steps;
determine a reference value based on multiple values for multiple nodes in the cluster;
generate a second graphical element visually representing how the respective values of the nodes in the cluster each relate to the reference value; and
transmit a display communication to a display device for causing the display device to output a graphical user interface having the first graphical element and the second graphical element.

2. The system of claim 1, wherein the first graphical element includes a graph visually indicating (i) the sequence of time steps along a first axis, and (ii) changes in the respective values of the nodes in the cluster during the sequence of time steps along a second axis.

3. The system of claim 1, wherein the memory device further includes instructions that are executable by the processing device for causing the processing device to:
determine a plurality of average node-values corresponding to the sequence of time steps, each average node-value being determined by averaging the values in a respective vector among the plurality of vectors for a respective time step among the sequence of time steps; and
incorporate a visual element into the graphical user interface that visually indicates the plurality of average node-values during the sequence of time steps.

4. The system of claim 1, wherein the second graphical element is a cluster map with cells, each cell in the cluster map corresponding to a respective node in the cluster and being color coded to represent a difference between (i) a particular value associated with the respective node, and (ii) the reference value.

5. The system of claim 4, wherein the reference value is an average of all of the values for all of the nodes in the cluster.

6. The system of claim 4, wherein the memory device further includes instructions that are executable by the processing device for causing the processing device to:
detect a user interaction with one or more cells in the cluster map; and
in response to detecting the user interaction with the one or more cells, visually highlight one or more portions of the first graphical element associated with one or more nodes that correspond to the one or more cells.

7. The system of claim 1, wherein the memory device further includes instructions that are executable by the processing device for causing the processing device to:
detect a user interaction with a portion of the first graphical element corresponding to a particular node in the cluster; and
in response to detecting the user interaction with the portion of the first graphical element corresponding to the particular node, visually display a window including additional information about the particular node.

8. The system of claim 1, wherein the gate is a forget gate, an input gate, or an output gate of the recurrent neural network.

9. The system of claim 1, wherein the gate is a first gate in the recurrent neural network, the graphical user interface includes a graphical object corresponding to a second gate in the recurrent neural network that is different from the first gate, and the memory device further includes instructions that are executable by the processing device for causing the processing device to:
- detect an interaction with the graphical object;
- in response to detecting the interaction with the graphical object, obtain another plurality of vectors indicating other values of another plurality of nodes in the second gate of the recurrent neural network resulting from processing data at the second gate during the sequence of time steps; and
- update the graphical user interface to include information derived from the other values in the other plurality of vectors.

10. The system of claim 1, wherein the first graphical element includes a plurality of charts, each chart among the plurality of charts corresponding to a respective cluster among the plurality of clusters and visually indicating how a set of values for a set of nodes in the respective cluster changed during the sequence of time steps.

11. The system of claim 10, wherein the second graphical element includes a plurality of cluster maps, each cluster map among the plurality of cluster maps corresponding to a respective chart among the plurality of charts and the respective cluster associated with the respective chart, and each cluster map visually indicating how the set of values for the set of nodes in the respective cluster each relate to a respective reference-value obtained using at least two values for at least two nodes in the respective cluster.

12. A non-transitory computer-readable medium comprising program code that is executable by a processing device for causing the processing device to:
- receive a plurality of vectors indicating values of a plurality of nodes in a gate of a recurrent neural network resulting from processing data at the gate during a sequence of time steps, each vector among the plurality of vectors including a respective value for each respective node among the plurality of nodes at a respective time step within the sequence of time steps;
- group the plurality of nodes into a plurality of clusters by applying a clustering method to the values of the plurality of nodes, the clustering method involving comparing how the respective value for each respective node changed during the sequence of time steps and assigning nodes with like changes during the sequence of time steps to a common cluster among the plurality of clusters;
- generate a first graphical element visually indicating how the respective values of the nodes in a cluster among the plurality of clusters changed during the sequence of time steps;
- determine a reference value based on multiple values for multiple nodes in the cluster;
- generate a second graphical element visually representing how the respective values of the nodes in the cluster each relate to the reference value; and
- transmit a display communication to a display device for causing the display device to output a graphical user interface having the first graphical element and the second graphical element.

13. The non-transitory computer-readable medium of claim 12, wherein the first graphical element includes a graph visually indicating (i) the sequence of time steps along a first axis, and (ii) changes in the respective values of the nodes in the cluster during the sequence of time steps along a second axis.

14. The non-transitory computer-readable medium of claim 12, wherein the second graphical element is a cluster map with cells, each cell in the cluster map corresponding to a respective node in the cluster and being color coded to represent a difference between (i) a particular value associated with the respective node, and (ii) the reference value.

15. The non-transitory computer-readable medium of claim 14, wherein the reference value is an average of all of the values for all of the nodes in the cluster.

16. The non-transitory computer-readable medium of claim 14, further comprising program code that is executable by the processing device for causing the processing device to:
- detect a user interaction with one or more cells in the cluster map; and
- in response to detecting the user interaction with the one or more cells, visually highlight one or more portions of the first graphical element associated with one or more nodes that correspond to the one or more cells.

17. The non-transitory computer-readable medium of claim 12, wherein the gate is a forget gate, an input gate, or an output gate of the recurrent neural network.

18. The non-transitory computer-readable medium of claim 12, wherein the gate is a first gate in the recurrent neural network, the graphical user interface includes a graphical object corresponding to a second gate in the recurrent neural network that is different from the first gate, and further comprising program code that is executable by the processing device for causing the processing device to:
- detect an interaction with the graphical object;
- in response to detecting the interaction with the graphical object, obtain another plurality of vectors indicating other values of another plurality of nodes in the second gate of the recurrent neural network resulting from processing data at the second gate during the sequence of time steps; and
- update the graphical user interface to include information derived from the other values in the other plurality of vectors.

19. The non-transitory computer-readable medium of claim 12, wherein the first graphical element includes a plurality of charts, each chart among the plurality of charts corresponding to a respective cluster among the plurality of clusters and visually indicating how a set of values for a set of nodes in the respective cluster changed during the sequence of time steps.

20. The non-transitory computer-readable medium of claim 19, wherein the second graphical element includes a plurality of cluster maps, each cluster map among the plurality of cluster maps corresponding to a respective chart among the plurality of charts and the respective cluster associated with the respective chart, and each cluster map visually indicating how the set of values for the set of nodes in the respective cluster each relate to a respective reference-value obtained using at least two values for at least two nodes in the respective cluster.

21. A method comprising:
- receiving, by a processing device, a plurality of vectors indicating values of a plurality of nodes in a gate of a recurrent neural network resulting from processing data at the gate during a sequence of time steps, each vector among the plurality of vectors including a respective value for each respective node among the plurality of nodes at a respective time step within the sequence of time steps;
- grouping, by the processing device, the plurality of nodes into a plurality of clusters by applying a clustering method to the values of the plurality of nodes, the clustering method involving comparing how the respective value for each respective node changed during the sequence of time steps and assigning nodes with like changes during the sequence of time steps to a common cluster among the plurality of clusters;

generating, by the processing device, a first graphical element visually indicating how the respective values of the nodes in a cluster among the plurality of clusters changed during the sequence of time steps;

determining, by the processing device, a reference value based on multiple values for multiple nodes in the cluster;

generating, by the processing device, a second graphical element visually representing how the respective values of the nodes in the cluster each relate to the reference value; and transmitting, by the processing device, a display communication to a display device for causing the display device to output a graphical user interface having the first graphical element and the second graphical element.

22. The method of claim 21, wherein the first graphical element includes a graph visually indicating (i) the sequence of time steps along a first axis, and (ii) changes in the respective values of the nodes in the cluster during the sequence of time steps along a second axis.

23. The method of claim 21, wherein the second graphical element is a cluster map with cells, each cell in the cluster map corresponding to a respective node in the cluster and being color coded to represent a difference between (i) a particular value associated with the respective node, and (ii) the reference value.

24. The method of claim 23, wherein the reference value is an average of all of the values for all of the nodes in the cluster.

25. The method of claim 23, further comprising:
detecting a user interaction with one or more cells in the cluster map; and
in response to detecting the user interaction with the one or more cells, visually highlighting one or more portions of the first graphical element associated with one or more nodes that correspond to the one or more cells.

26. The method of claim 21, wherein the gate is a forget gate, an input gate, or an output gate of the recurrent neural network.

27. The method of claim 21, wherein the gate is a first gate in the recurrent neural network, the graphical user interface includes a graphical object corresponding to a second gate in the recurrent neural network that is different from the first gate, and further comprising:

detecting an interaction with the graphical object;
in response to detecting the interaction with the graphical object, obtaining another plurality of vectors indicating other values of another plurality of nodes in the second gate of the recurrent neural network resulting from processing data at the second gate during the sequence of time steps; and
updating the graphical user interface to include information derived from the other values in the other plurality of vectors.

28. The method of claim 21, wherein the first graphical element includes a plurality of charts, each chart among the plurality of charts corresponding to a respective cluster among the plurality of clusters and visually indicating how a set of values for a set of nodes in the respective cluster changed during the sequence of time steps.

29. The method of claim 28, wherein the second graphical element includes a plurality of cluster maps, each cluster map among the plurality of cluster maps corresponding to a respective chart among the plurality of charts and the respective cluster associated with the respective chart, and each cluster map visually indicating how the set of values for the set of nodes in the respective cluster each relate to a respective reference-value obtained using at least two values for at least two nodes in the respective cluster.

* * * * *